(12) United States Patent
Bleacher et al.

(10) Patent No.: US 9,584,846 B2
(45) Date of Patent: Feb. 28, 2017

(54) IN-FLIGHT ENTERTAINMENT SYSTEM WITH WIRELESS HANDHELD CONTROLLER AND CRADLE HAVING CONTROLLED LOCKING AND STATUS REPORTING TO CREW

(71) Applicant: Thales Avionics, Inc., Irvine, CA (US)

(72) Inventors: Brett Bleacher, Rancho Santa Margarita, CA (US); Christopher K. Mondragon, Laguna Niguel, CA (US); Charles G. Smith, Irvine, CA (US); Richard J. Lopez, Rancho Cucamonga, CA (US)

(73) Assignee: Thales Avionics, Inc., Irvine, CA (US)

( * ) Notice: Subject to any disclaimer, the term of this patent is extended or adjusted under 35 U.S.C. 154(b) by 677 days.

(21) Appl. No.: 14/028,185

(22) Filed: Sep. 16, 2013

(65) Prior Publication Data

US 2014/0053185 A1 Feb. 20, 2014

Related U.S. Application Data

(63) Continuation-in-part of application No. 13/328,224, filed on Dec. 16, 2011, now Pat. No. 9,060,202.
(Continued)

(51) Int. Cl.
*H04N 21/414* (2011.01)
*H04N 21/442* (2011.01)
(Continued)

(52) U.S. Cl.
CPC .... *H04N 21/41422* (2013.01); *G08B 13/1427* (2013.01); *H04N 21/2146* (2013.01);
(Continued)

(58) Field of Classification Search
CPC ............ H04N 21/2143; H04N 21/2146; H04N 21/4126; H04N 21/41422; H04N 21/43615; H04N 21/44227; H04N 21/4524; G08B 13/1427; G08B 21/0261; G08B 21/0275
See application file for complete search history.

(56) References Cited

U.S. PATENT DOCUMENTS

| 6,147,980 A | 11/2000 | Yee et al. |
| 6,499,027 B1 | 12/2002 | Weinberger |

(Continued)

FOREIGN PATENT DOCUMENTS

WO  WO 98/44400 A2  10/1998

OTHER PUBLICATIONS

International Search Report and Written Opinion of the International Searching Authority, PCT International Application No. PCT/US2011/065437, Mar. 7, 2012.
(Continued)

*Primary Examiner* — Benjamin R Bruckart
*Assistant Examiner* — Aklil Tesfaye
(74) *Attorney, Agent, or Firm* — Myers Bigel, P.A.

(57) ABSTRACT

A vehicle entertainment system is disclosed that includes docking cradles that can store handheld controllers, and a management terminal. The management terminal controls an electronically controlled lock apparatus of the cradles to selectively lock the handheld controllers in a stored position within the docking cradles. The management terminal may receive and display the status of which of the docking cradles store a handheld controller, and may display at least one user selectable indicia that is touch selectable by a user to control one or more of the docking cradles to lock and unlock handheld controllers stored therein. Related inductive charging circuits, theft alert circuits, and other components of the vehicle entertainment system are disclosed.

18 Claims, 9 Drawing Sheets

Related U.S. Application Data

(60) Provisional application No. 61/702,061, filed on Sep. 17, 2012.

(51) Int. Cl.
  *H04N 21/45* (2011.01)
  *H04N 21/436* (2011.01)
  *H04N 21/41* (2011.01)
  *H04N 21/214* (2011.01)
  *G08B 21/02* (2006.01)
  *G08B 13/14* (2006.01)

(52) U.S. Cl.
  CPC ... *H04N 21/4126* (2013.01); *H04N 21/43615* (2013.01); *H04N 21/44227* (2013.01); *H04N 21/4524* (2013.01); *G08B 21/0261* (2013.01); *G08B 21/0275* (2013.01)

(56) References Cited

U.S. PATENT DOCUMENTS

| | | | |
|---|---|---|---|
| 6,928,654 B2 | 8/2005 | Tranchina et al. | |
| 7,809,333 B2 | 10/2010 | Jougit | |
| 7,840,991 B2 | 11/2010 | Dusenberry et al. | |
| 8,677,423 B2 | 3/2014 | Hicks, III et al. | |
| 2005/0273823 A1 | 12/2005 | Brady, Jr. et al. | |
| 2006/0082961 A1* | 4/2006 | Mecca | B60R 11/0211 361/679.23 |
| 2006/0143662 A1* | 6/2006 | Easterling | H04N 5/50 725/76 |
| 2006/0238301 A1 | 10/2006 | Wu et al. | |
| 2007/0123215 A1 | 5/2007 | Wang et al. | |
| 2007/0124765 A1 | 5/2007 | Bennett et al. | |
| 2007/0135046 A1 | 6/2007 | Kapur et al. | |
| 2007/0157256 A1* | 7/2007 | Kitazawa | B60R 11/0264 725/75 |
| 2007/0157285 A1 | 7/2007 | Frank et al. | |
| 2007/0199028 A1* | 8/2007 | Yau | B60K 35/00 725/77 |
| 2007/0250872 A1 | 10/2007 | Dua | |
| 2007/0288969 A1 | 12/2007 | Prum | |
| 2008/0057868 A1 | 3/2008 | Chang | |
| 2008/0253317 A1 | 10/2008 | Gercekci et al. | |
| 2009/0061841 A1 | 3/2009 | Chaudhri et al. | |
| 2009/0228908 A1* | 9/2009 | Margis | H04N 7/163 725/6 |
| 2010/0060739 A1 | 3/2010 | Salazar | |
| 2010/0198428 A1* | 8/2010 | Sultan | G07C 9/00309 701/2 |
| 2010/0297941 A1 | 11/2010 | Doan et al. | |
| 2011/0086631 A1 | 4/2011 | Park et al. | |
| 2011/0107377 A1* | 5/2011 | Petrisor | H04L 12/40182 725/76 |
| 2011/0174926 A1 | 7/2011 | Margis et al. | |
| 2011/0314507 A1 | 12/2011 | Keen et al. | |
| 2012/0066722 A1 | 3/2012 | Cheung et al. | |
| 2013/0074111 A1* | 3/2013 | Hyde | H04N 21/4126 725/25 |

OTHER PUBLICATIONS

Written Opinion of the International Preliminary Examining Authority, PCT International Application No. PCT/US2011/065437, Jan. 22, 2013.
International Preliminary Report on Patentability, International Application No. PCT/US11/65437, May 3, 2013.
Communication with Supplementary European Search Report, European Patent Application No. EP11 85 3378, Feb. 23, 2015.
Communication pursuant to Article 94(3) EPC, Application No. Ep 11 853 378.5, Dec. 1, 2016.
Steffen et al., "Near Field Communication (NFC) in an Automotive Environment", *IEEE Second International Workshop on Near Field Communication*, Apr. 20, 2010, pp. 15-20 (XP031683705).

* cited by examiner

IN-FLIGHT ENTERTAINMENT SYSTEM WITH WIRELESS HANDHELD CONTROLLER AND CRADLE HAVING CONTROLLED LOCKING AND STATUS REPORTING TO CREW

RELATED APPLICATIONS

The present application claims the benefit of priority from U.S. Provisional Patent Application 61/702,061, filed Sep. 17, 2012, and from U.S. patent application Ser. No. 13/328,224 entitled "Controlling Display of Content on Networked Handheld controller and Video Display Units", filed Dec. 16, 2011, the disclosures of both which is hereby incorporated herein in their entirety by reference.

TECHNICAL FIELD

The present disclosure relates to electronic entertainment systems and, more particularly, to handheld controllers used for remotely controlling in-flight entertainment systems.

BACKGROUND

In-flight entertainment (IFE) systems have been deployed onboard aircraft to provide entertainment for passengers in a passenger cabin. The in-flight entertainment systems typically provide passengers with video and audio programming. Some in-flight entertainment systems include an electronic communications network having a head-end server and seat-end electronics boxes that are coupled with video display units located at passenger seats or a head-end server connected through floor or sidewall junction boxes that daisy chain to multiple video display units located at the passenger seats. The video display units display content that is distributed from the head-end server over the communications network. Remote controllers facilitate a user's control of the content displayed on the video display units. The controllers typically include remote controls for personal use by passengers at their seats in the aircraft.

User interfaces to existing IFE systems may include a touch screen on a dedicated seat display monitor or video display unit disposed at the passenger seat, such as in the seat back in front of the passenger seat. A user interface can be provided by a remote controller that is wireless or tethered at a passenger seat while being within reach of the passenger.

A tethered controller can be handheld while tethered via a cable to a location in an aircraft in the vicinity of the passenger seat, such as to a seat back in front of the passenger seat or to an arm rest adjacent to the passenger seat. Tethering of the controller allows it to be comfortably held by a passenger for viewing and manipulation, while also preventing the controller from being removed by the passenger from its installation location (e.g., removed from the aircraft). However, the tethering cable extending between the controller and the tethered location (e.g., to a forward seat back) can create a barrier to the pathway of an adjacent passenger and/or to a serving tray or other object being passed to the passenger or the adjacent passenger. Moreover, the tethering cable may not extend a sufficient distance and/or may exert an excessive recoil force to allow the controller to be comfortably held when a passenger is reclined in a seat or has otherwise moved further from the tethered location.

For these and other reasons, it can be desirable to eliminate tethering between the handheld controller and the associated IFE systems. The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

SUMMARY

The following disclosure describes vehicle entertainment systems, docking cradles for vehicle entertainment systems, and related methods that may address the foregoing problems identified in the Background.

In one embodiment, the docking cradle includes a housing and an electronically controlled lock apparatus. The housing has a recessed area to receive and store a handheld controller. The electronically controlled lock apparatus is connected to the housing and configured to lock the handheld controller within the recessed area of the housing preventing removal by a passenger responsive to a lock electrical signal from a management terminal separate from the docking cradle. The lock apparatus is further configured to unlock the handheld controller permitting removal by a passenger from the recessed area of the housing responsive to an unlock electrical signal from the management terminal.

Some further embodiments are directed to the lock apparatus, which responds to the unlock electrical signal from the management terminal by enabling movement of a locking tab to release an end portion of the handheld controller when a passenger presses an unlock button connected to the housing, and responds to the lock electrical signal from the management terminal by disabling movement of the locking tab to prevent release of the first end portion of the handheld controller when a passenger presses the unlock button. The lock apparatus can include a solenoid controlled responsive to the lock electrical signal to move an arm structure to block movement of the locking tab when a passenger presses the unlock button. Other methods of locking and unlocking such as inductive, polarization, capacitive, magnetic, etc may be used to engage and disengage the locking mechanism.

The docking cradle may include an inductive charging circuit within the housing that inductively couples to a corresponding inductive charging circuit within a handheld controller, which is stored in the recessed area of the housing, to supply power to charge a battery of the handheld controller. An electronic control circuit may determine whether a controller is stored in the recessed area of the housing by sensing whether the inductive charging circuit is inductively coupled to an inductive charging circuit within a controller.

Some related embodiments are directed to a vehicle entertainment system that includes a plurality of the docking cradles and a management terminal. The management terminal is communicatively connected to the docking cradles to control generation of the lock and unlock electrical signals provided to the lock apparatus, and to receive and display on a display device the status of which of the docking cradles store a handheld controller. The management terminal may display on the display device a map of passenger seats in the vehicle and indicates a status of which of the seats have handheld controllers docked or not docked in the docking cradles connected to the seats. The management terminal may display on the display device at least one user selectable indicia that is touch selectable by a user to control generation of the lock and unlock electrical signals provided to a defined one or more of the docking cradles to lock and unlock handheld controllers stored in the docking cradles.

Some further embodiments are directed to a theft detector positioned within the vehicle, such as near an exit, and that outputs an alert message responsive to detecting that a handheld controller is being carried within a sensing range of the theft detector or the attendant can issue the alert alarm to the handheld controller directly via a special control panel. The alert message may be communicated to the handheld controller to generate an alert sound.

Pairing of the handheld controller to a specific docking cradle and connected video display unit can be performed via a short-range wireless technology such as NFC (Near Field Communications) wireless technology. Whereby if a handheld controller is damaged, lost, stolen or swapped accidently, then another new or used handheld controller can be automatically paired with its associated docking cradle and video display unit by inserting the new or swapped handheld controller within the cradle and to cause wireless pairing to be performed responsive to them becoming in close proximity to each other. This pairing can be fully automatic, with requiring human intervention, and does not require any manual or special configuration settings. Other wireless technologies can also be used to pair the handheld controller to the cradle.

Other vehicle entertainment systems, docking cradles for vehicle entertainment systems, and methods according to embodiments of the invention will be or become apparent to one with skill in the art upon review of the following drawings and detailed description. It is intended that all such additional systems, docking cradles for vehicle entertainment systems, and methods be included within this description, be within the scope of the present invention, and be protected by the accompanying claims. Moreover, it is intended that all embodiments disclosed herein can be implemented separately or combined in any way and/or combination.

BRIEF DESCRIPTION OF THE DRAWINGS

The accompanying drawings, which are included to provide a further understanding of the disclosure and are incorporated in and constitute a part of this application, illustrate certain non-limiting embodiment(s) of the invention. In the drawings.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Although various embodiments of the present invention are explained herein in the context an in-flight entertainment (IFE) environment, other embodiments of entertainment systems and related controllers are not limited thereto and may be used in other environments, including other vehicles such as ships, submarines, buses, trains, commercial/military transport aircraft, and automobiles, as well as buildings such as conference centers, restaurants, businesses, hotels, homes, etc. Accordingly, in some embodiments users are referred to, in a non-limiting way, as passengers.

Figure 1:
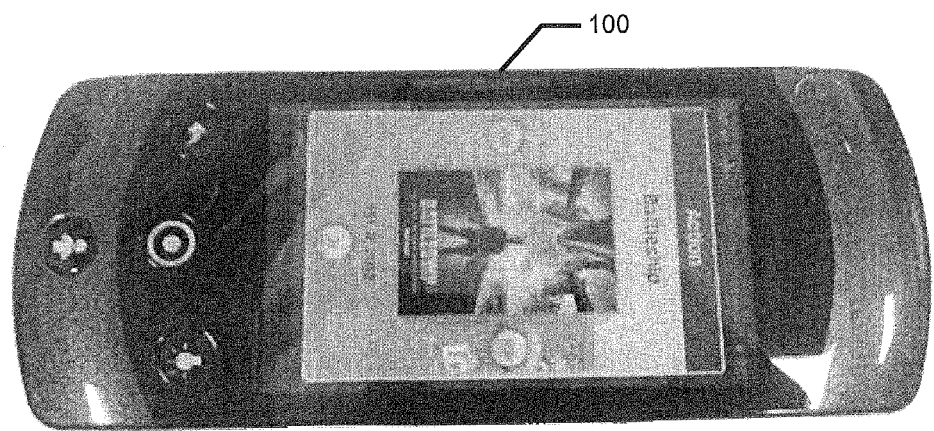
FIG. 1 is a front view picture of an example wireless handheld controller that is wirelessly connected to an IFE system to control the display of information and menuing and which can further receive and display information from the IFE system in accordance with some embodiments.

Various embodiments of wireless handheld controllers, docking cradles, and entertainment systems are described herein which provide benefits over prior systems. FIG. 1 is a front view picture of an example handheld controller 100 that communicates through a wireless connection to an IFE system to control the display of information on a display device of the IFE system, and which can further receive and display information from the IFE system. The wireless handheld controller is also referred to herein, for brevity, as a "handheld controller" and "controller".

The controller 100 is a handheld device that provides a flexible entertainment control experience to a passenger or other user by supporting multitasking so that the passenger may conduct multiple activities simultaneously using the IFE system. The controller 100 may be easily customizable by the IFE system manufacturer or aircraft operator for different aircraft, customer, and/or passenger requirements. Such customization can include, but is not limited to, changing languages that are used for display of textual information, machine generated speech, and/or machine recognized speech from passengers, and/or cultural customizations as well as other airline operator or flight route customizations. The controller 100 may also facilitate customization of user selectable indicia on a touch screen interface, such as changes to soft button locations/indicia to provide customized touch screen based game controllers which may be automatically reconfigured for use with different game programs, which can be selected among by a passenger for execution.

Figure 2:
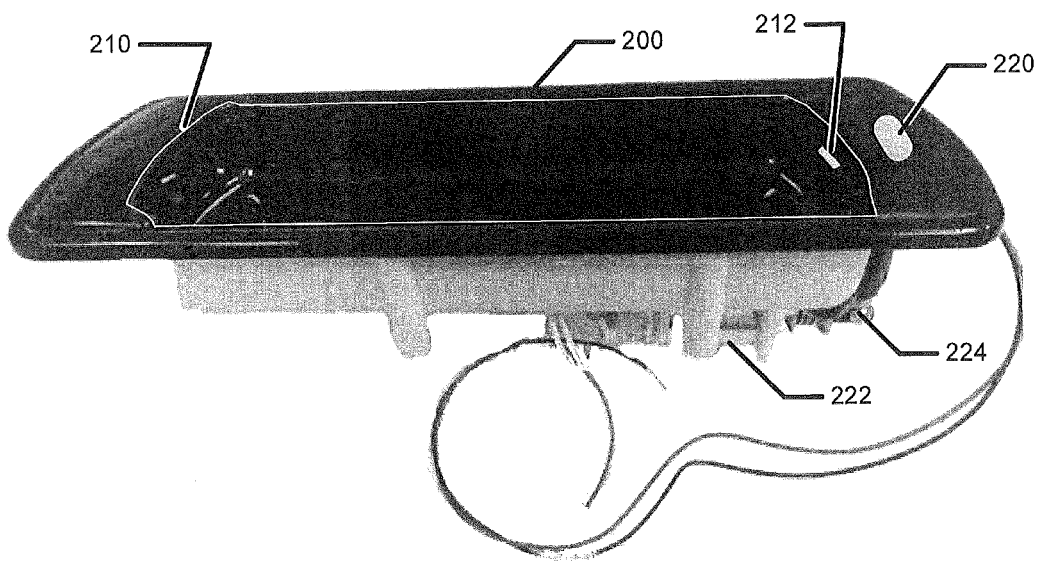
FIG. 2 is a side view picture of an example docking cradle that is configured to receive and lockably retain the controller of FIG. 1 in accordance with some embodiments.

The controller 100 is securely storable in a docking cradle. The controller is also referred to as being cradled while stored in the docking cradle. FIG. 2 is a side view picture of an example docking cradle 200 that is configured to receive the controller 100 of FIG. 1, and includes an electronically controlled lock apparatus connected to a housing of the docking cradle 200 and configured to lock the controller 100 in a stored position within the docking cradle to prevent removal from a recessed area of the docking cradle 200 by a passenger responsive to a lock electrical signal from a management terminal separate from the docking cradle 200, and configured to unlock the controller 100 to permit removal by a passenger from the recessed area of the docking cradle 200 responsive to an unlock electrical signal from the management terminal.

In one embodiment, the electronically controlled lock apparatus includes a portion of the docking cradle housing that forms a retention overhang surface 210, which extends over a recessed area of the housing, and engages a first end portion of the controller 100 to retain the first end portion of the controller 100 in the stored position. The lock apparatus also includes a locking tab 212 that extends over the recessed area of the docking cradle housing to engage a second end portion, opposite to the first end portion, of the controller 100 (e.g., a top surface and/or a recessed area of the controller 100, such as a boss area that receives a portion of the locking tab 212) to retain the second end portion of the controller 100 in the stored position. The locking tab 212 can be moved (actuated) by a user pressing an unlock button 220, which allows the user to remove the controller 100 from docking cradle 200.

The lock apparatus responds to the unlock electrical signal from the management terminal by enabling movement of the locking tab 212 to release the first end portion of the controller 100 when a passenger presses the unlock button 220 connected to the housing, and responds to the lock electrical signal from the management terminal by disabling movement of the locking tab 212 to prevent release of the first end portion of the controller 100 when a passenger presses the unlock button 220.

Figure 3:
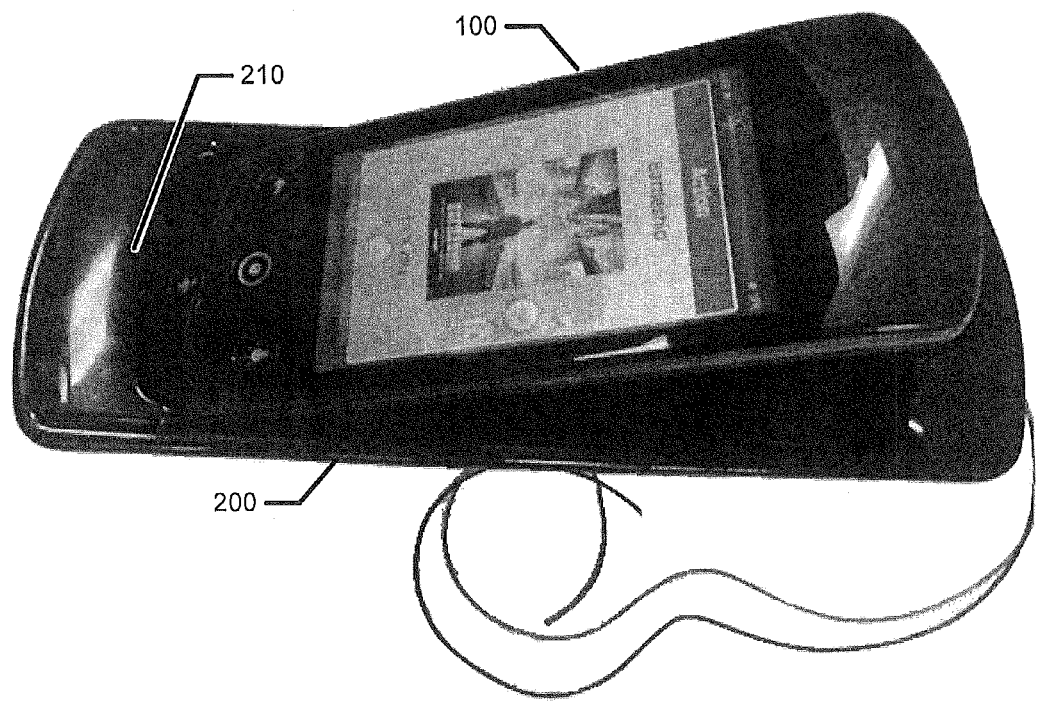
FIG. 3 is a top view picture of the controller of FIG. 1 being inserted into the docking cradle of FIG. 2 in accordance with some embodiments.
Figure 4:
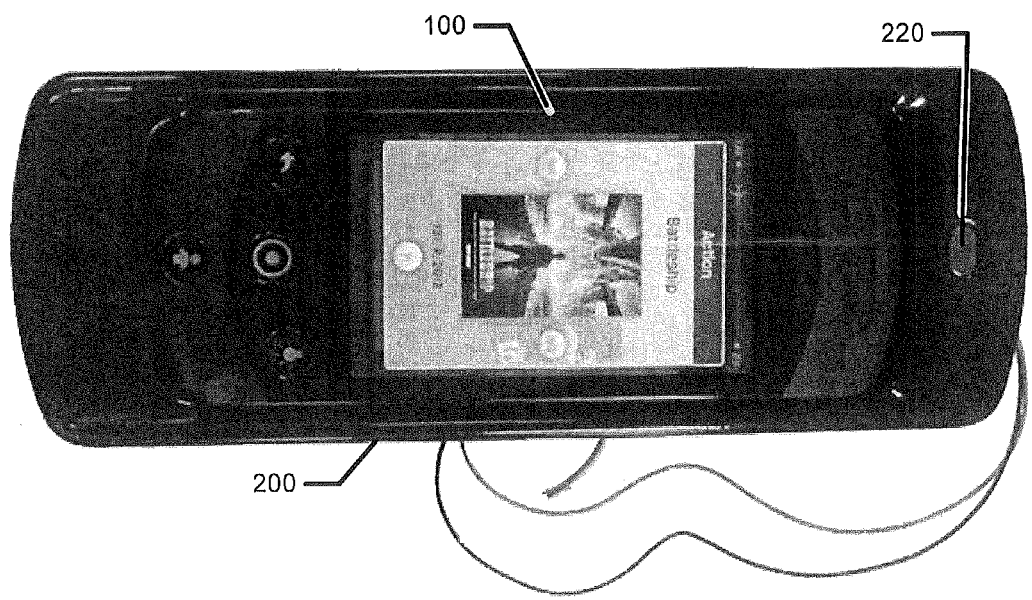
FIG. 4 is a top view picture of a subsequent arrangement to FIG. 3 in which the controller is locked into the docking cradle in accordance with some embodiments.

FIG. 3 is a top view picture of the controller 100 of FIG. 1 being inserted into the docking cradle 200 of FIG. 2 in accordance with some embodiments. Referring to FIG. 3, an end portion of the controller 100 is seated underneath the retention overhang surface 210 of the docking cradle housing. FIG. 4 is a top view picture of a subsequent configuration to FIG. 3 in which the controller 100 is locked into the docking cradle 200, with one end portion of the controller 100 seated underneath the retention overhang surface 210 and the other end portion engaged by the locking tab 212.

Figure 5:
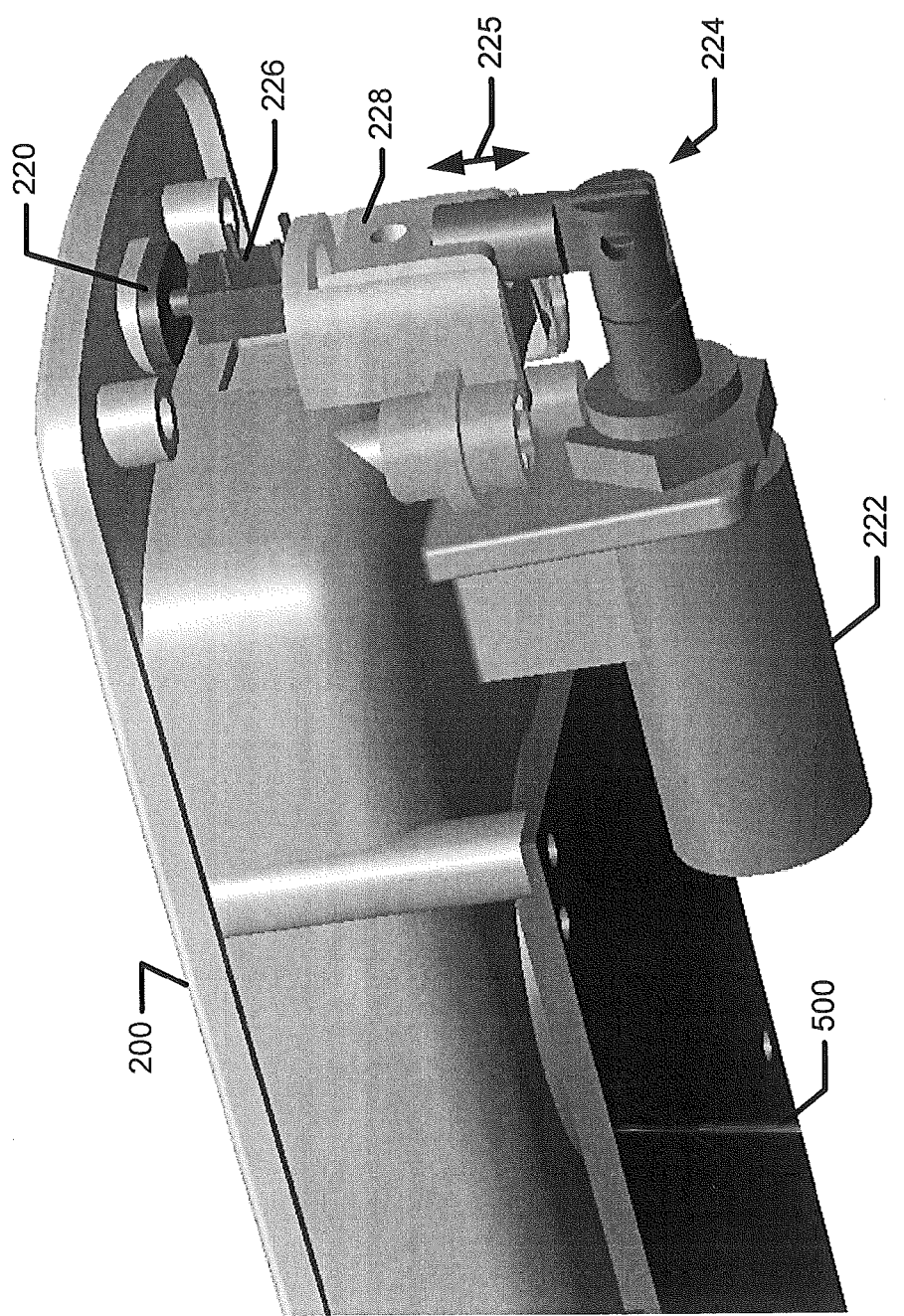
FIG. 5 shows a side-rear view of a locking apparatus that is electronically controllable to lock the controller into the docking cradle and to unlock the controller to allow removal from the docking cradle in accordance with some embodiments.

In accordance with some embodiments, the unlock button 220 can be disabled under the control of an electronic control circuit (responsive to the lock and unlock electrical signals from the management terminal or other circuit) so that a passenger cannot remove the controller 100 from the docking cradle 200 until the electronic control circuit re-enables the unlock button 220. FIG. 5 shows a side-rear view of a locking apparatus that is electronically controllable to lock the controller 100 into the docking cradle responsive to a lock signal and to unlock the controller 100 responsive to an unlock signal to allow removal from the docking cradle 200 in accordance with some embodiments. The lock and unlock signals may, for example, be conducted through a same physical conductive path or separate physical conductive paths from management terminal or other electronic circuit.

The controller 100 may be locked into the docking cradle 200, either automatically or responsive to a crew generated signal, to prevent removal of the controller 100 from the docking cradle 200 during take-off, landing, taxiing, passenger boarding/disembarking, and/or while the aircraft is parked, and/or to prevent removal of the controller 100 from the docking cradle 200 of a seat that is known by the crew and/or the IFE system as being unoccupied during a flight leg.

In one embodiment, the IFE system receives information identifying which seats are assigned to passengers for a flight leg, and can further determine from the information which seats are unoccupied for the flight leg. The IFE system can generate a signal to the lock apparatus (e.g., the solenoid 222) to lock the controller 100 into the docking cradle 200 for all unoccupied seats to prevent removal of the controllers 100 during boarding, traveling, and disembarking associated with the flight leg.

Moreover, as will be explained in further detail below, a status of whether a controller 100 is stored in the docking cradle 200 can be electronically reported to the crew (e.g., report the seat number associated with the docking cradle 200, report the name of the passenger assigned to the seat, etc.) so that the crew can intervene to prevent removal of the controller 100 when passengers are disembarking the aircraft, when passengers are boarding the aircraft and accidentally/intentionally attempt to remove the controller 100 from an unoccupied seat, and/or when the aircraft is operating in a mode (e.g., take-off/taxiing/etc) when use of the controller 100 is not allowed.

Referring to FIG. 5, the example locking apparatus 224 includes a solenoid 222 that is controlled by an electronic control circuit on a circuit board 500 responsive to a lock/unlock control signal from an external controller circuit which may reside in for example, a crew management terminal. The solenoid 222 reversibly moves an arm structure 228 along a pathway shown by arrows 225 to block movement of a tab assembly 226. The tab assembly 226 is moved responsive to passenger actuation of the unlock button 220 to release the handheld controller 100 from the cradle 200. The solenoid 222 can be controlled to rotate/axially move in a first direction to move the arm structure 228 to prevent movement of the tab assembly 226 and, thereby, lock the handheld controller 100 within the docking cradle 200 irrespective of any attempt by a passenger to depress the unlock button 220. In contrast, the solenoid 222 can be oppositely controlled to oppositely rotate/axially move in a second opposite direction to move the arm structure 228 away from the tab assembly 226 to allow movement of the tab assembly 226 and, thereby, unlock the handheld controller 100 within the docking cradle 200. While unlocked, the passenger can depress unlock button 220 to remove the handheld controller 100 from the dock cradle 200.

Figure 6:
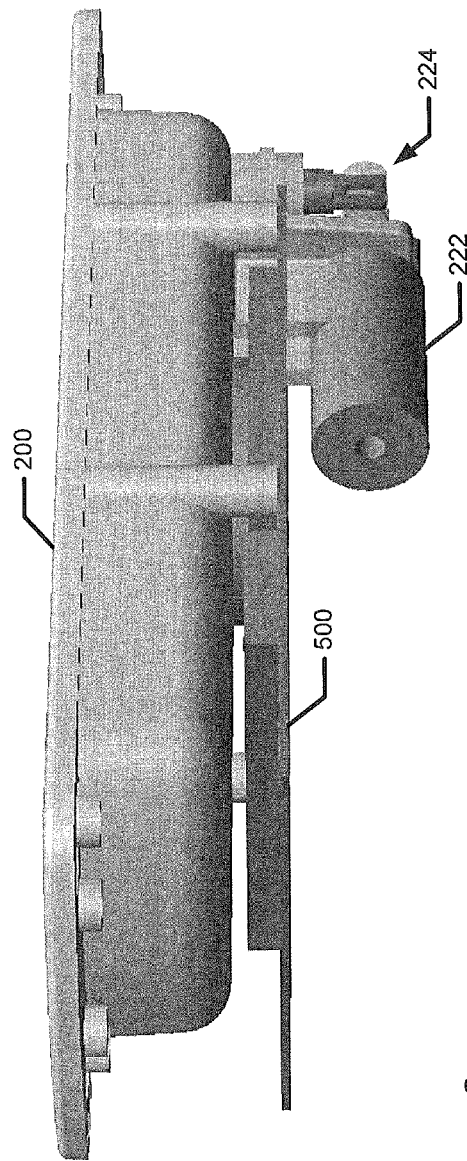
FIG. 6 shows a front-side view of the electronically controlled locking apparatus of FIG. 5 in accordance with some embodiments.
Figure 7:
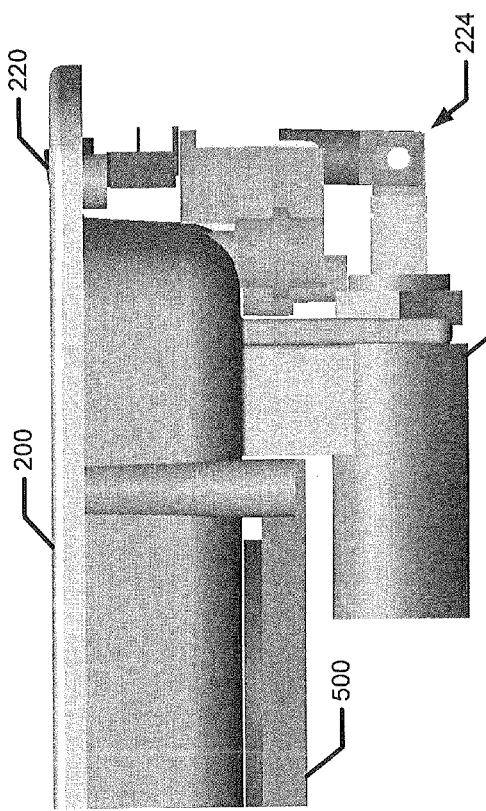
FIG. 7 shows an expanded partial side view of the electronically controlled locking apparatus of FIG. 5 in accordance with some embodiments.

FIG. 6 shows a front-side view of the locking apparatus 224 of FIG. 5 in accordance with some embodiments. FIG. 7 shows an expanded partial side view of the locking apparatus 224 of FIG. 5 in accordance with some embodiments.

Figure 8:
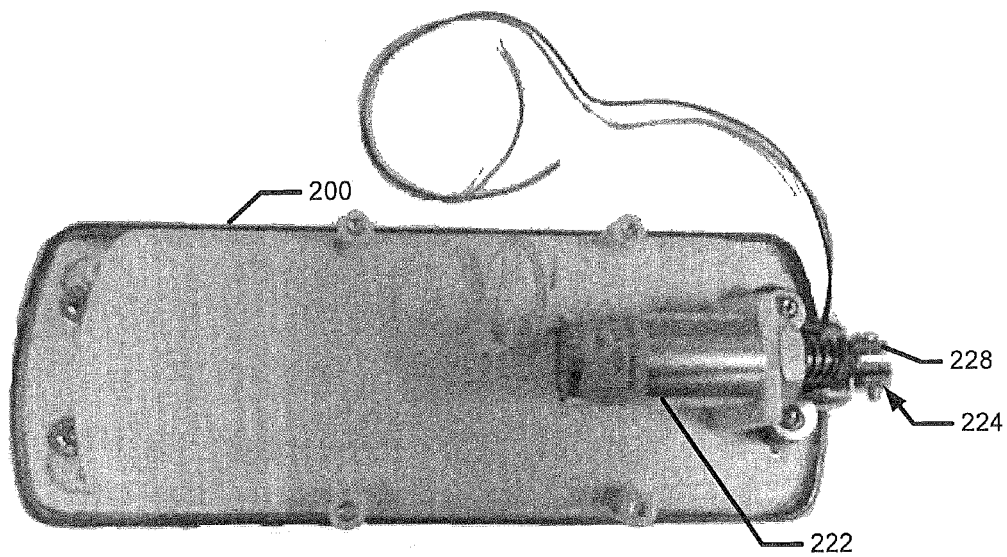
FIG. 8 is a bottom view picture of a portion of a docking cradle of FIG. 2, a solenoid, and a portion of an arm structure of a locking apparatus in accordance with some embodiments.
Figure 9:
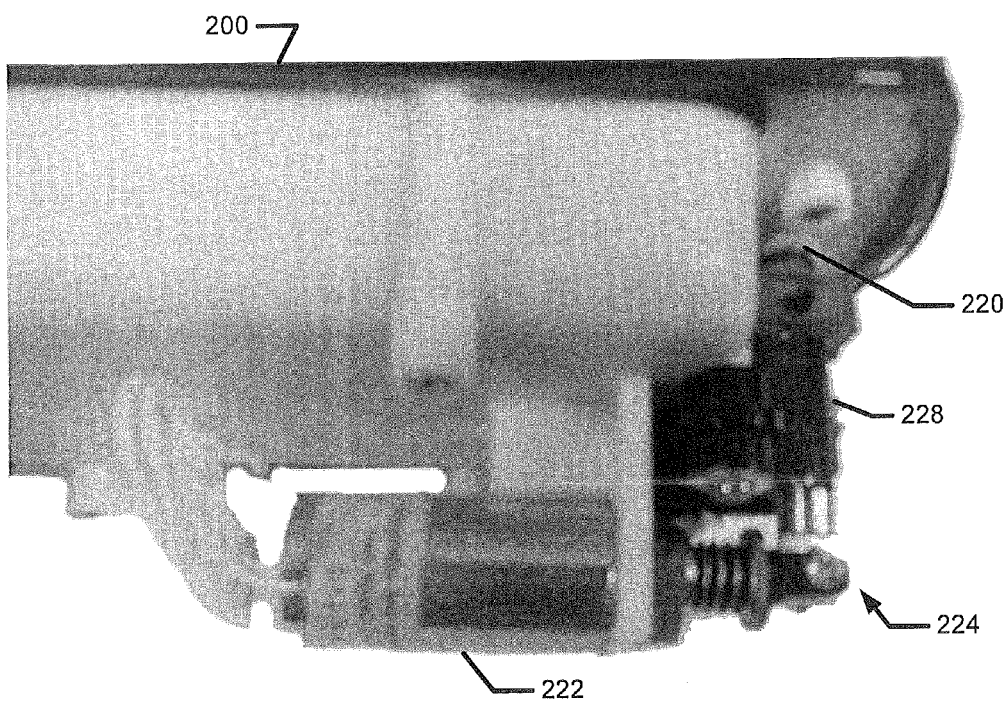
FIG. 9 is expanded partial side view picture of the docking cradle and the electronically controlled locking apparatus of FIG. 8 in accordance with some embodiments.

FIG. 8 is a bottom view picture of a portion of the docking cradle 200 of FIG. 2, the solenoid 222, and a portion of the arm structure 228 of the locking apparatus 224 in accordance with some embodiments. FIG. 9 is an expanded partial side view picture of the docking cradle 200 and the locking apparatus 224 of FIG. 8 in accordance with some embodiments.

Figure 10:
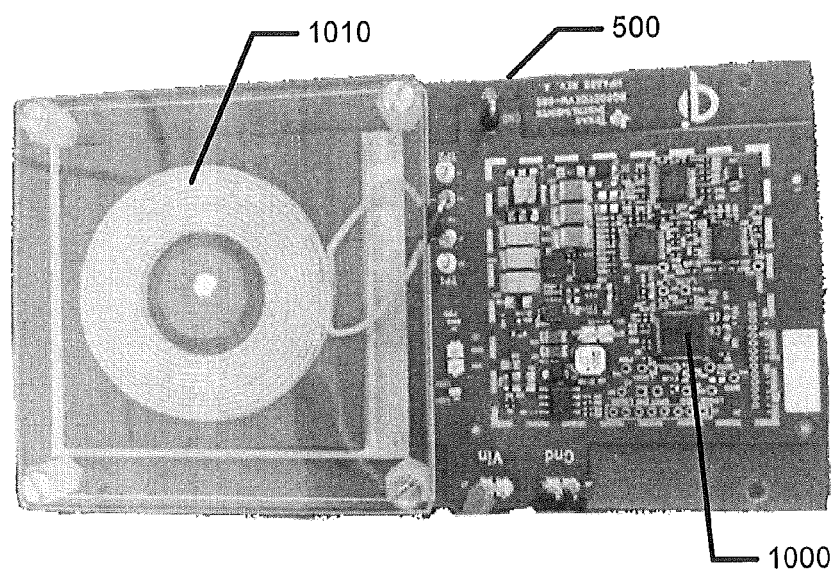
FIG. 10 is top view picture of a circuit board of the docking cradle of FIG. 2, including an inductive charging circuit in accordance with some embodiments.

FIG. 10 is top view picture of a circuit board 500 of the docking cradle 200 of FIG. 2. Referring to FIG. 10, the circuit board 500 includes an electronic control circuit 1000 that receives a lock/unlock control signal from a management terminal or other external control circuit and responds to the lock/unlock control signal by controlling movement of the solenoid 222 to either lock or unlock movement of the locking tab 212 to correspondingly lock or unlock the handheld controller 100 in the docking cradle 200. While locked, the passenger is prevented from using the unlock button 220 to remove the handheld controller 100 from the docking cradle 200.

The circuit board 500 further includes an inductive charging circuit 1010 that is powered by charging circuitry of the circuit board 500. The inductive charging circuit 1010 inductively couples to a corresponding inductive charging circuit within the handheld controller 100 to supply power thereto for charging a battery of the handheld controller 100 while the handheld controller 100 is stored in the docking cradle 200.

Figure 11:
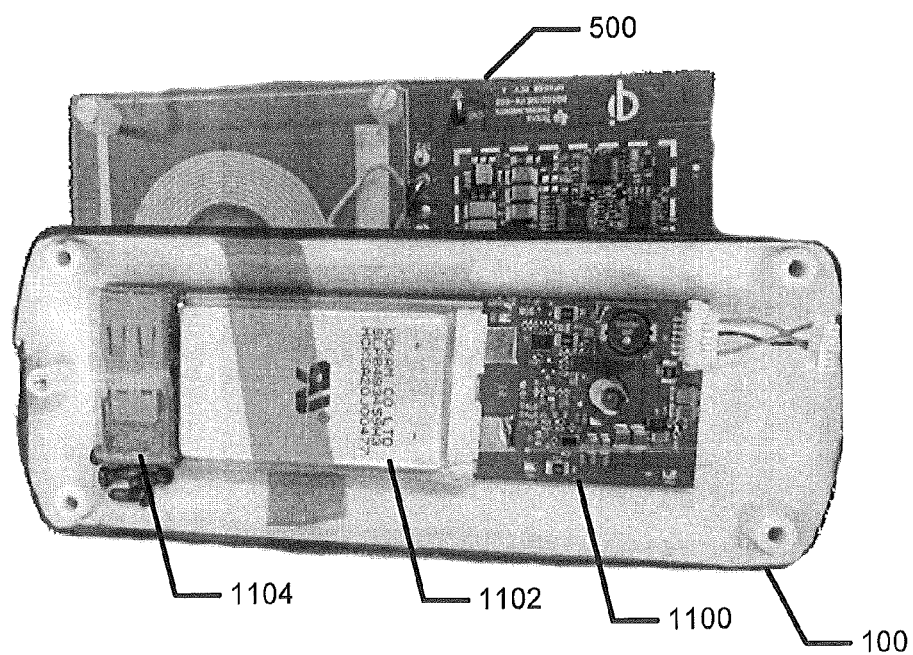
FIG. 11 is a picture of a circuit board and battery of the handheld controller of FIG. 1, which includes a control circuit and inductive charging circuit that can be powered by the inductive charging coil circuit of FIG. 10 in accordance with some embodiments.

FIG. 11 is a picture of a circuit board 1100 of the handheld controller 100 of FIG. 1, which includes a control circuit 1102 and an inductive charging circuit 1104 that can be powered by the inductive charging coil circuit 1010 of FIG. 10 in accordance with some embodiments. These and other components are described in further details below.

The docking cradle 200 may determine whether the controller 100 is stored in the recessed area of the docking cradle housing (i.e., docked) by sensing whether the inductive charging coil circuit 1010 is inductively coupled to the inductive charging circuit 1104 of the controller 100, and can communicate with a crew management terminal or other external control circuit to electronically report (e.g., communicate a message across a data network) a status of whether a controller is stored in the recessed area of the docking cradle 200. For example, the electronic control circuit 1000 of the docking cradle 200 can monitor inductive loading of the inductive charging coil circuit 1010 to determine whether the controller 100 is stored in the recessed area (i.e., docked), and can output a docked/undocked control signal to a crew management terminal or other external control circuit to indicate the determined status of whether the controller 100 is docked in the docking cradle 200.

Alternatively or additionally, the docking cradle 200 and the controller 100 can include near field communication transmitter/receiver circuits (e.g., RFID, NFC, . . . ). The docking cradle 200 can determine whether the controller 100 is docked by attempting to communicate through the near field communication circuit with the near field communication circuit of the controller 100. The electronic control circuit 1000 of the docking cradle 200 can output a docked/undocked control signal to a crew management terminal or other external control circuit to indicate the determined status of whether the controller 100 is docked in the docking cradle 200 (i.e., docked status when the communication was successful, and undocked status when unsuccessful).

The docking cradle 200 may alternatively or additionally include a mechanical or electromagnetic switch (e.g., magnetic reed switch) that is actuated by storing and removing the controller 100 from the recessed area of the docking cradle 200 housing. The electronic control circuit 1000 of the docking cradle 200 can respond to a signal from the switch to output a docked/undocked control signal to a crew management terminal or other external control circuit to indicate the determined status of whether the controller 100 is docked (stored) or undocked (removed).

In one embodiment, near field communications between near field transceivers of the controller 100 and the associated docking cradle 200 are used to determine whether the controller 100 has been removed from the associated docking cradle 200 or has become outside a defined range of the associated docking cradle 200, and a flight attendant can be notified via a crew management terminal responsive to that determination. For example, as explained below, the controller 100 may be paired to a near field communication transceiver (e.g., NFC transceiver, RFID transceiver or Bluetooth transceiver) associated with the cradle 200 and/or the SVDU 400 to form a near field communication link therebetween. The controller 100 and/or the paired cradle 200/SVDU 400 can detect loss of the near field communication link and communicate a responsive alert message to a crew management terminal monitored by a crew member. The crew member can thereby be notified when, for example, a controller 100 is not properly stored (e.g., cradled) during takeoff, landing, taxiing of an aircraft, and/or when the aircraft is parked at a gate and a controller 100 is being carried off the aircraft.

In a more general embodiment, the docking cradle 200 can include a network interface within the housing that communicates through a data network with a head end content server, and a first transceiver circuit within the housing that communicates through a wireless communication link with a second transceiver circuit of the controller 100 to relay commands received via the second transceiver circuit from the controller 100 to the head end content server via the network interface, and to relay media received from the head end content server to the controller 100 via the second transceiver circuit.

The first transceiver circuit can include a near field communication transceiver, and the electronic control circuit can determine whether the controller 100 is stored in the recessed area of the housing by attempting to communicate through the near field communication transceiver with a near field communication transceiver of the controller 100, and communicate with the crew management terminal to report whether the controller 100 is stored in the recessed area of the housing.

The docking cradle 200 can assist with informing a passenger when to store a controller. In one embodiment, the electronic control circuit 1000 of the docking cradle 200 can be configured to respond to receiving a command from a crew management terminal or other external control circuit for the docking cradle 200 to lock the controller 100 that is determined to not be presently stored in the recessed area by transmitting a sound generation command through a transceiver circuit to the controller 100 to command generation of an alert sound through a speaker of the controller 100. The alert sound may provide audible instructions to the passenger to store the controller 100 in the docking cradle 200. Alternatively or additionally, the electronic control circuit 1000 of the docking cradle 200 may transmit a display message and a sound generation command to the controller 100. The display message causes the controller 100 to display a message on a display device of the controller 100 that instructs a passenger to store the controller 100 in the docking cradle 200, and the sound generation command causes the controller 100 to generate an alert sound that alerts a passenger to read and react to the message displayed on the display device.

Figure 12:
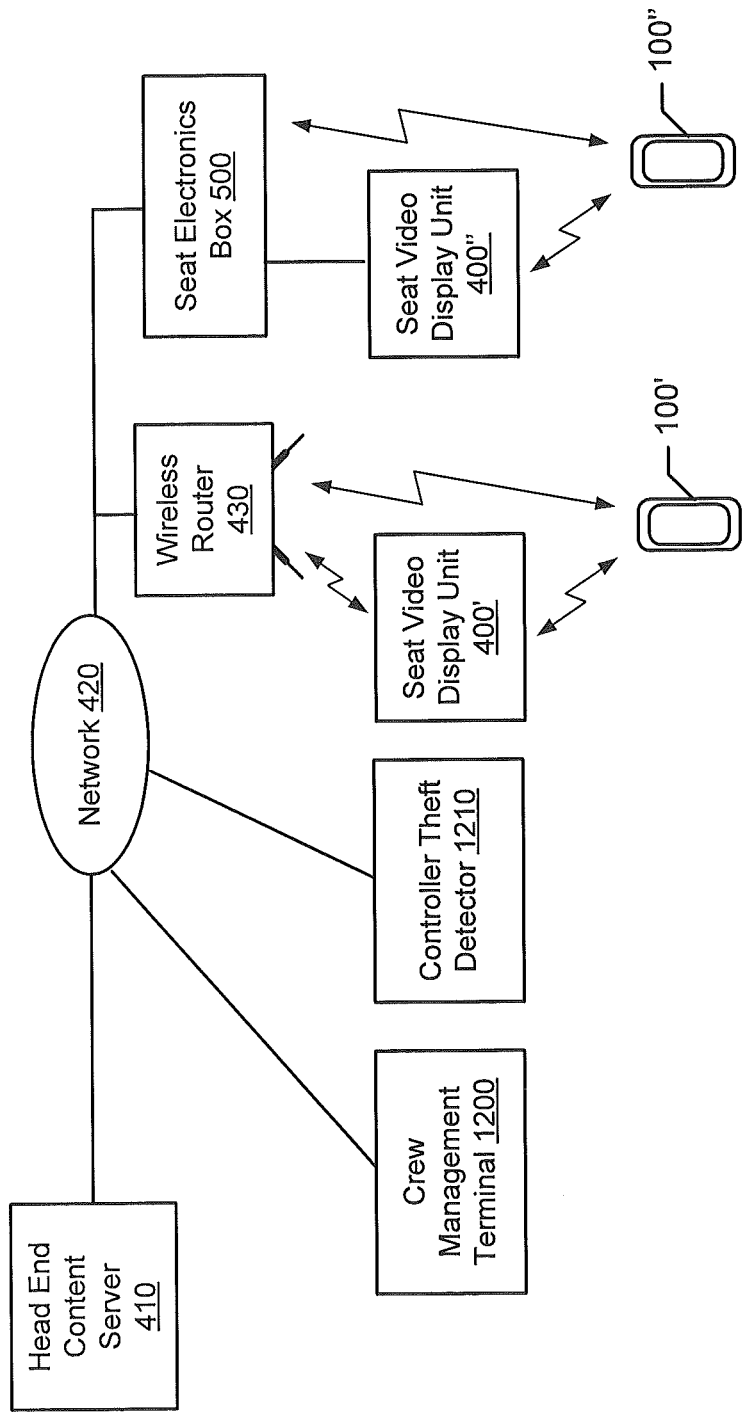
FIG. 12 is a block diagram of an entertainment system that includes handheld controllers and other system components which are configured according to some embodiments of the present invention.

Example Entertainment System Having Wireless Connections Between Handheld Controllers and Other Components FIG. 12 is a block diagram of an entertainment system that includes handheld controllers 100, seat video display units (SVDUs) 400, and other system components which are configured according to some embodiments of the present invention. Each handheld controller 100 is communicatively connected (e.g., paired) to control one of the SVDUs 400. A docking cradle 200 may be connected to each seat in the vehicle. When used in an aircraft, train, bus, or other vehicle environment having rows of seats, a docking cradle 200 can be attached to each seatback so that they face passengers in a following seat to receive and store a handheld controller 100 for use by a passenger in that facing seat. The docking cradle 200 may instead be attached to an armrest, overhead panel, or other structure within the vehicle that can reached by a passenger when traveling to a seat, standing adjacent to a seat, or while seated.

The system further includes a head end content server 410 that contains content that can be downloaded to the SVDUs 400, and may be further download to the corresponding handheld controllers 100, through a data network 420 and/or a wireless router 430. Example content that can be downloaded from the head end content server 410 can include, but is not limited to, movies, TV shows, other video, audio programming, and application programs (e.g. game programs). The data network 420 may be a packet network (e.g., Ethernet), and wireless router 430 may be a WLAN (e.g. IEEE 802.11, WIMAX, etc) and/or a cellular-based network (e.g. a pico cell).

When used in an aircraft environment, the SVDUs 400 can be attached to seatbacks so that they face passengers in a following row of seats. The handheld controllers 100 contain a communication transceiver circuit (e.g., Bluetooth, WLAN, cellular, etc.) configured to wirelessly communicate with a communication transceiver circuit residing in a corresponding one of SVDUs 400', in a corresponding docking cradle 200 to which it is assigned for storage, within the wireless router 430, and/or another device connected to the network 420. For example, the controller 100' can be communicatively connected through a direct wireless communication link to the SVDU 400' and/or through an indirect communication link that is relayed through the wireless router 430 to the SVDU 400'.

The system may include seat electronics boxes 500 that can be distributed within an aircraft to interconnect the head end content server 410 to the SVDUs 400" and/or the handheld controllers 100. For example, the seat electronics box 500 can be configured to route media from the head end content server 410 to selected ones of the SVDUs 400" and/or the handheld controllers 100", and to relay commands (e.g., media selection commands, media playback commands, etc.) from the SVDUs 400" and/or the handheld controllers 100" to the head end content server 410. The handheld controllers 100" can communicate through a wireless communication link (e.g., Bluetooth, WLAN, etc.) to the associated SVDUs 400" and/or through the seat electronic boxes 500.

Although some embodiments are described herein in the context of a handheld controller that communicates with a seat video display unit, the handheld controller is not limited to communicating with a seat video display unit and may be used to control any type of separate video display unit. Moreover, the controller may be used independently of a separate video display unit. For example, a handheld controller may be a tablet computer or other computerized electronic device that can provide video playback and/or application programming (e.g., electronic gaming) responsive to content residing in the controller and/or receivable the head end content server 410 or other device, and which is storable in a docking cradle configured according to one or more of the embodiments disclosed herein.

The handheld controller can also be used as a flight crew device whereby the use case is dedicated to the flight crew during flight and connected on a separate wireless network than the passenger IFE network system. The flight crew can use the handheld controller to communicate via text, voice, email, etc between other flight crew members or communicate to other passengers.

The handheld controller can also be used as a maintenance crew device whereby the use case is dedicated to the maintenance crew during ground maintenance and connected on a separate wireless network than the passenger IFE network system. The maintenance crew can use the handheld controller to run maintenance diagnostics and communicate between maintenance personnel.

In accordance with some embodiments, a passenger can operate a controller 100 to control what content is displayed and/or how the content is displayed on the associated SVDU 400 and/or on the controller 100. For example, a passenger can operate the controller 100 to select among movies, games, audio program, and/or television shows that are listed on the SVDU 400, and can cause a selected movie/game/audio program/television show to be played on the SVDU 400, played on the controller 100, or played on a combination of the SVDU 400 and the controller 100 (e.g., concurrent display on separate screens).

Each controller 100 in the IFE system may be assigned a unique network address (e.g., media access control (MAC) address, Ethernet address). In addition, each SVDU 400 may be each assigned a unique network address (e.g., MAC address, Ethernet address) which are different from the respective controller 100 network addresses. In some embodiments, the controller 100 and the respective SVDU 400 may be coupled with a same seat-end electronics box 500 (when utilized by the system) that functions as a local network switch or node to provide network services to a group of passenger seats, for example a row of seats. In other embodiments, the controller 100 and the respective SVDU 400 may be coupled with different seat-end electronics boxes 500 (when utilized by the system).

For example, a controller 100 for use by a passenger in an aircraft seat identified by a passenger readable identifier (e.g., a printed placard) as seat "14B" may be attached to a seat electronics box 500 that provides network connections to row "14", while the SVDU 400 installed in the seat back in front of seat "14B" for use by the passenger in seat "14B" may be attached to a different seat electronics box 500 that provides network connections to row "13." Some other network configurations do not contain a seat electronics box but utilize a floor disconnect box and daisy chain the Ethernet network between Smart Video Display units.

Example Crew Management Terminal Control of Locking/Unlocking and Detection of Controller Theft/Misplacement The handheld controllers 100 may be locked into the docking cradles 200, either automatically or responsive to a crew generated command, to prevent removal of the controller 100 from the docking cradle 200 during take-off, landing, taxiing, passenger boarding/disembarking, and/or to prevent removal of the controller 100 from the docking cradle 200 of a seat that is known by the crew and/or the IFE system as being unoccupied during a flight leg.

Moreover, as will be explained in further detail below, a status of whether the controllers 100 are stored in their associated docking cradles 200 can be electronically reported to the crew (e.g., report the seat number associated with each controller 100 stored in an associated docking cradle 200, reporting the name of a passenger who is assigned to the seat number, etc.) so that the crew can intervene to prevent removal of a controller 100 when passengers are disembarking the aircraft, when passengers are boarding the aircraft and may accidentally/intentionally attempt to remove a controller 100 from an unoccupied seat, and/or when the aircraft is operating in a phase (e.g., take-off phase, landing phase, taxiing phase, etc) when use of the controller 100 is not allowed.

With continuing reference to FIG. 12, the system can include a crew management terminal 1200, which may be a fixed (e.g., mounted to a structure within the vehicle) or mobile communication terminal containing a display device and crew input interface. A crew member may operate the crew management terminal 1200 to control the lock and unlock state of a selected one or more of the docking cradles 200. For example, a crew member may select one or more of the docking cradles 200 to be controlled to a locked or unlocked state by identifying a seat number, a passenger name, a selected group of the docking cradles 200 (e.g., identify a group of docking cradles 200 in first class, business class, and/or coach class, and/or a group of docking cradles 200 associated with premium class passengers), and/or by indicating all of the docking cradles 200. As noted above, one or more of the handheld controllers can be configured and operated as a crew management terminal by crew persons and/or as a maintenance management terminal by maintenance persons.

The crew management terminal 1200 of FIG. 12 can be configured to maintain a listing of which docking cradles 200 are associated with which controllers 100, which may be represented by a listing of pairs of the network address of each of the docking cradles 200 and the wireless communication identifier of the controller 100 that is assigned to be docked therewith. The terminal 1200 may alternatively or additionally maintain a list of known associations between the controllers 100 (e.g., wireless communication identifiers) and passenger names.

A controller 100 may be paired with a particular docking cradle 200 by, for example, using a near field communication circuit in the controller 100 and/or the docking cradle 200 to sense an NFC (Near Field Communications) and/or Radio Frequency IDentification (RFID) tag on the docking cradle 200, the controller 100, and/or the SVDU 400 and by communicating the identifying information obtained from the NFC or RFID tag to the crew management terminal 1200. The crew management terminal 1200 can respond to information that identifies a docking cradle and a controller by updating the list of known pairings between docking cradles (e.g., wireless communication identifier) and controllers (e.g., network address), paring the controller 100 to a particular SVDU 400 (e.g., network address) associated with the docking cradle 200 for control purposes, and may further associate known passenger names and/or passenger seat numbers with the known pairings or other known information (e.g., associate passenger names with controller addresses).

The controllers 100 can each include a first transceiver circuit, a second transceiver circuit, and a processing device. The pairing process between a pair of a controller 100 and a SVDU 400 may include the first transceiver circuits of the SVDU 400 and the controller 100 communicating an identifier for one of the pair to the other one of the pair (e.g., the SVDU can communicate its identifier to the controller, or vice versa), and the processing device of the other one of the pair can use the received identifier to control the second transceiver circuit to perform pairing to establish a communication link between the second transceiver circuits of the pair. The first transceiver circuits may be NFC and/or RFID circuits, and the second transceiver circuits may be WLAN transceiver circuits, Bluetooth transceiver circuits, and/or cellular transceiver circuits.

The crew management terminal 1200 may communicate with the SVDUs 400 to receive information on pairings between the respective SVDUs 400 and the controllers 100, maintain a list of the pairings, and use the list of the pairings to determine routing information used to route media from the head end content server 410 through one of the SVDUs 400 to one of the controllers 100 paired to the one of the SVDUs 400.

The crew management terminal 1200 may display the cradled status of the controllers 100, such as by displaying a LOPA (Layout of Passenger Accommodations) map or listing of passenger seats and by displaying an indication of which seats have controllers 100 that are docked or not docked in the corresponding docking cradles 200. The crew management terminal 1200 can include a user interface (e.g., a touch sensitive interface overlaid on a display device, keyboard, keypad, etc.) that can be operated by a crew member to control the lock/unlock state of the electronically controlled lock apparatus of the controllers 100.

Figure 13:
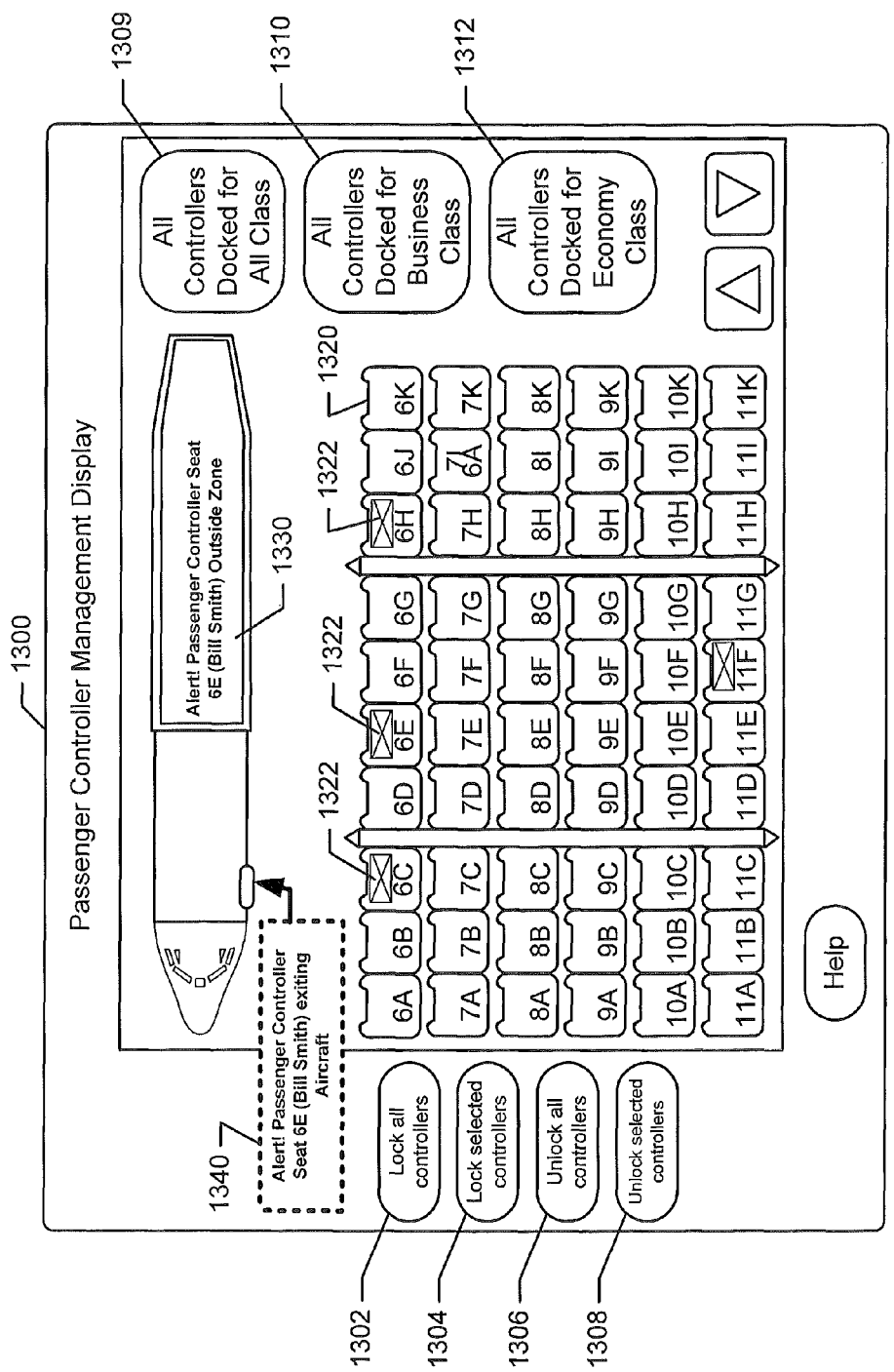
FIG. 13 illustrates an example display layout of a crew management terminal that can be used by a crew member to determine the cradled status of wireless handheld controllers and to control the lock/unlock state of cradled controllers.

FIG. 13 is an example display layout 1300 of the crew management terminal 1200 that can be used by a crew member to determine the cradled status of controllers 100 and to control the lock/unlock state of the electronically controlled lock apparatus of the docking cradles 200. Referring to FIG. 13, a crew member can select among displayed user selectable indicia (e.g., soft-buttons) to unlock or lock controllers 100 from docking cradles 200 within groups of passenger seats (e.g., business class, economy class, etc.) and/or may selectively unlock or lock controllers 100 from docking cradles 200 at particular passenger seats that are selected by the crew member.

For example, a crew member may select the user selectable indicia (e.g., button) 1302 titled "lock all controllers" to communicate a lock control signal from the crew management terminal 1200 to all docking cradles 200 to lock the controllers 100 therein. Similarly, a crew member may select the user selectable indicia (e.g., button) 1306 titled "unlock all controllers" to communicate an unlock control signal from the crew management terminal 1200 to all docking cradles 200 to unlock the controllers 100 therein. A crew member may select the user selectable indicia (e.g., button) 1308 titled "unlock selected controllers" or select the user selectable indicia (e.g., button) 1304 titled "lock selected controllers" and then touch-select one or more illustrated passenger seats 1320 (or vice versa touch-select one or more illustrated seats 1320 and then touch the desired user selectable indicia (e.g., button) 1308/1304) to communicate an unlock/lock control signal from the crew management terminal 1200 to the one or more docking cradles 200 associated with the selected one or more passenger seats to cause the electronically controlled lock apparatus to unlock/lock the stored controller(s) 100.

Enabling a crew member to control the lock/unlock status of docking cradles 200 at individual passenger seats can be particularly useful to, for example, enable a crew member to respond to a passenger switching seats from a previously assigned seat to an unoccupied seat for a flight leg, by operating the terminal 1200 to lock the controller 100 stored in the docking cradle 200 at the previously assigned seat and to unlock the controller at the docking cradle 200 at the newly occupied seat.

The crew management terminal 1200 and/or a crew member may sequentially unlock groups of controllers 100 stored in docking cradles 200 to, for example, allow the highest tier of premium seat passengers to have first access to certain entertainment functions, and then subsequently allow a lower tier of premium seat passengers to obtain access, and, so on, to the lower tier of seated passengers who are to be allowed access.

The display layout 1300 can include various information items that inform a crew member as to which seats have controllers 100 stored in corresponding docking cradles 200 and which do not have controllers 100 stored in corresponding docking cradles 200. For example, an alert indicia 1322 can be displayed within the illustrated seat profiles 1320 for seat locations 6C, 6E, 6H, and 11F to indicate that the respective controllers 100 are not presently stored in the corresponding docking cradles 200 at those seats. A crew member can respond to such displayed information by asking the seated passengers to properly store the controllers 100 in the cradles 200, and by further reviewing the display layout 1300 to confirm that the requested action has been completed.

The crew management terminal 1200 can be configured to respond to receiving a command for a docking cradle 200 to lock a controller 100 that is determined to not be presently stored in the recessed area by transmitting a sound generation command through a transceiver circuit (e.g., residing in the docking cradle 200, a SVDU associated with the controller 100, etc.) to the controller 100 to command generation of an alert sound through a speaker of the controller 100. The alert sound may provide audible instructions to the passenger to store the controller 100 in the docking cradle 200. Alternatively or additionally, the crew management terminal 1200 may transmit a display message and a sound generation command to the controller 100. The display message causes the controller 100 to display a message on a display device of the controller 100 that instructs a passenger to store the controller 100 in the docking cradle 200, and the sound generation command causes the controller 100 to generate an alert sound that alerts a passenger to read and react to the message displayed on the display device.

The system can include a theft detector 1210 (FIG. 12) positioned at a defined location within the vehicle and configured to output an alert message responsive to detecting that a handheld controller is being carried within a sensing range of the theft detector. For example, the theft detector 1210 can be configured to detect when a controller is being carried off the aircraft and/or beyond a defined region of the aircraft. The theft detector 1210 may include circuitry that provides near field communication or other types of communications between a theft detector transceiver positioned at an aircraft exit and/or at another defined location within the aircraft to identify when a controller has become within its communication range. For example, the theft detector transceiver can include a RFID reader that can read a RFID tag within the controller 100 that has been carried within sensing range of the RFID reader, and respond by communicating an alert message through a data network to the crew management terminal 1200 that identifies the passenger seat that is associated with the identified controller 100 and can alternatively or additionally identify the passenger name that is assigned to the identified passenger seat.

Alternatively or additionally, the theft detector 1210 may respond to loss of a short range communication connection (e.g., Bluetooth connection, low power WIFI, etc.) between a controller 100 and a SVDU 400 or another transceiver mounted in the aircraft near the associated docking cradle 200 by generating an alert that indicates that the controller has been removed from a communication zone of the passenger's seat. The controllers 100 may be configured to respond to loss of the short range communication connection by generating an audible sound that alerts the passenger and/or a crew member of the controller 100 improperly leaving the zone, and may further display an alert description on a display device of the subject controller 100 to explain to the passenger that the controller 100 must be returned to the assigned docking cradle 200 and/or the assigned seat.

As shown in the example of FIG. 13, the crew management terminal 1200 can display an alert message 1330 that identifies that a handheld controller 100 for seat 6E (assigned to Bill Smith) has traveled outside a defined zone for that controller 100. A security transceiver can, for example, be mounted within the forward business class section to sense when a controller 100 from the rearward economy class has been carried forward into the business class section, and report an alert signal to the crew terminal 1200 to trigger the alert message 1330. A crew member can respond to the alert message 1330 by confiscating the controller 100 (e.g., if the passengers are presently disembarking), confirming that the passenger assigned to the associated seat is who is carrying the controller 100 (e.g., during an ongoing flight leg), or asking the passenger to return the controller 100 to the assigned seat.

A theft detector 1210 may be mounted at each exit from the aircraft to sense when a controller 100 is being carried off the aircraft, and to responsively report an alert signal to the crew management terminal 1200 to trigger an alert message 1340 that is displayed on the layout 1300. The illustrated alert message 1340 alerts a crew member that a handheld controller for seat 6E (assigned to Bill Smith) is about to be carried off the aircraft. A crew member can respond to the alert message 1330 by confiscating the controller 100 or asking the passenger to return the controller 100 to the assigned seat.

The crew management terminal 1200 may also respond to detection of a controller 100 being carried outside a defined zone for the controller 100 and/or being carried toward an exit of the aircraft by communicating a wireless message to the controller 100 that causes the controller 100 to generate an audible sound that alerts the passenger and/or a crew member of the controller 100 improperly leaving the zone and/or approaching the aircraft exit, and may further display an alert description on a display device of the subject controller 100 to explain to the passenger that the controller 100 must be returned to the assigned docking cradle 200 and/or the assigned seat.

Identifying the passenger's name to the crew member can be particularly advantageous for enabling the crew member to identify a particular person who is carrying a controller 100 (perhaps concealed in a coat, bag, etc.) from among a crowd of passengers who are disembarking an aircraft. Accordingly, a passenger manifest, which identifies passenger names and assigned seat locations can be loaded into the crew management terminal 1200.

For example, the crew management terminal 1200 can maintain a list of known associations between handheld controllers 100 and passenger names. The alert message can identify the handheld controller 100 detected as being carried within a sensing range of the theft detector 1210. The management terminal 1200 can respond to the alert message by using the handheld controller identity to determine the associated passenger name from the list, and to include the associated passenger name with the alert indication provide to crew, such as by including the passenger's name in an alert message displayed on the crew management terminal 1200.

The alert message output by the theft detector 1210 may identify the handheld controller 100 (e.g., a communication identifier of the controller 100) detected as being carried beyond the defined region of the vehicle. The management terminal 1200 can respond to the alert message by communicating a command through the data network 420 for wireless communication to the handheld controller 100 identified by the alert message to generate an alert sound therefrom.

The theft detector 1210 may communicate an alert message directly to a handheld controller 100 that has been carried within its communication range, instead or in addition to communicating the alert message to the management terminal 1200. Each of the controllers 100 can include a transceiver circuit to communicate with the theft detector 1200 to receive a sound generation command, and processing circuitry to respond to the sound generation command by generating an alert sound through a speaker.

The display layout 1300 may further identify when all controllers are properly docked in corresponding docking cradles for all seat classes (message 1309), for all business class seats (message 1310), and/or for all economy class seats (message 1312). A crew member can thereby quickly determine whether continued monitoring of one or more particular classes of seats is needed without individually reviewing the status of every seat that is displayable in the display layout 1300 or walking the aisles to visually observe the docking status of each docking cradle 200 at each seat location along the aisles.

The crew management terminal 1200 and/or another component of the system may operate to automatically control the lock/unlock status of the docking cradles 200 by outputting a lock/unlock control signal responsive to one or more rules. The crew management terminal 1200 may determine, or be communicatively connected to receive aircraft flight information (e.g., from a flight computer, etc.) that indicates when the aircraft has transitioned to a new status that serves as a condition for locking or unlocking the docking cradles 200. Example statuses that can trigger the crew management terminal 1200 to lock, or maintain locked, the docking cradles 200 can include: take-off flight phase, landing flight phase, taxiing flight phase, parked at terminal phase with passengers boarding/disembarking.

The crew management terminal 1200 can determine, or be informed, when the aircraft has reached an altitude or other condition when use of electronic equipment by passengers is authorized, and can respond thereto by generating an unlock control signal that is communicated to the docking cradles 200 to cause unlocking of the associated controllers 100. In this manner, the crew management terminal 1200 can operate to automatically regulate when passengers can remove controllers 100 from the docking cradles 200 and, thereby, prevent passenger handling of controllers 100 while the plane is being boarded, disembarked, and/or before the plane has reached an altitude/other condition where use of the controllers 100 is authorized.

Example Handheld Controller

Figure 14:
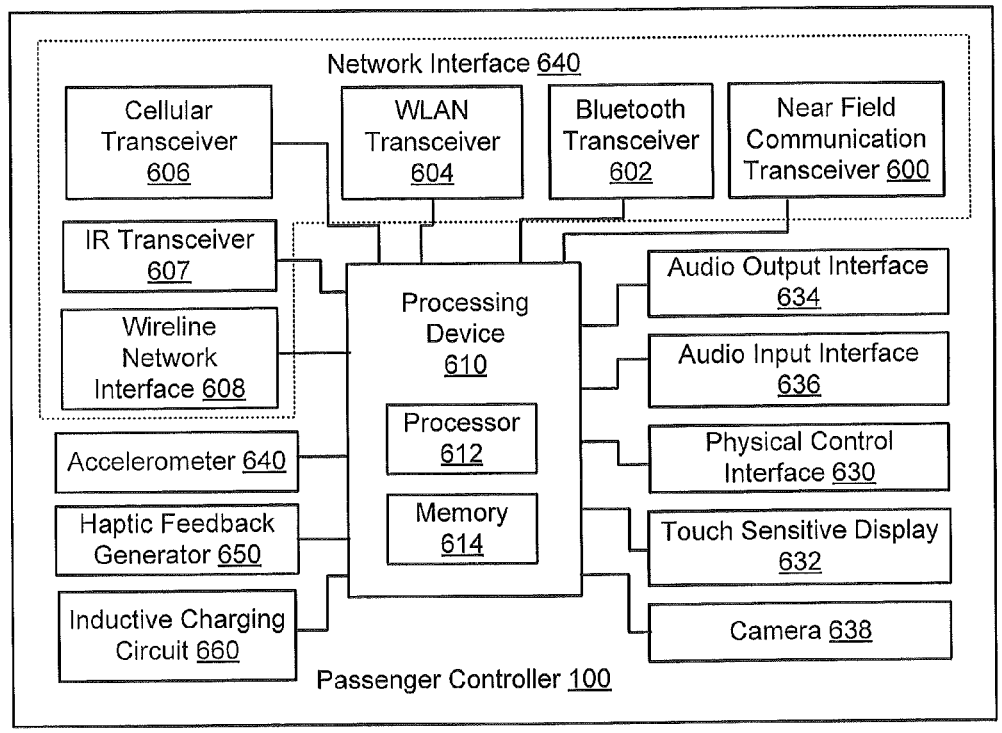
FIG. 14 is a block diagram of a wireless handheld controller that is configured according to some embodiments of the present invention.

FIG. 14 is a functional circuit block diagram of a handheld controller 100 configured according to some embodiments of the present invention. The controller 100 includes a network interface 640, a display device 632, and a processing device 610. The network interface can be configured to communicate via a wireless communication interface with a video display unit, a wireless router 430, a seat electronics box 500, and/or another communication component of the IFE system of FIG. 12 or another IFE system within a vehicle.

The display device 632 may be configured as a touch sensitive display. The processing device 610 may be connected to a camera 638 to receive a stream of images of a passenger, and may be configured to identify gestures that a passenger creates based on an orientation and/or relative positioning of fingers of a hand, placement of hands and/or arms, and/or facial gestures created by the passenger's mouth and/or eyes.

The processing device 610 may include one or more data processors 612, such as a general purpose and/or special purpose processor (e.g., microprocessor and/or digital signal processor), and memory 614. The processor 612 is configured to execute computer program instructions from the memory 614, described below as a computer readable media, to perform at least some of the operations and methods described herein as being performed by a handheld controller in accordance with one or more embodiments of the present invention.

The processor 612 may execute a standard operating system for mobile devices, handheld computing devices, tablet computing devices, or personal digital assistants such as the ANDROID operating system. As such, the processor 612 may be compatible with and execute a wide variety of standard applications available for the operating system, independent of the IFE system and the respective proximately installed SVDU 400. In addition, standard off-the-shelf development platforms available for the standard operating system may facilitate rapid and straightforward application development by the aircraft operator for deployment on the controller 100. In this way, changes to the look and feel or additions to the functionality of the IFE system may be accomplished with reduced effort without requiring any changes to the hardware or recertification of the IFE system. Furthermore, the aircraft operator and/or users may download and install any of the thousands of applications available on the internet or the ANDROID MARKETPLACE for implementation, testing, integration, and use onboard the aircraft by the controllers 100 and the SVDUs 400.

Although the example controller 100 show in FIGS. 1, 3, and 4 may have a general form factor and touch screen functionality that is similar to a smart phone, it is not limited thereto. Other example embodiments of a controller 100 can include, but are not limited to, a tablet computer, a palmtop computer, and a laptop computer.

The controller 100 may further include audio output/input interfaces 634, 636, a physical control interface 630, an accelerometer 640 that provides an output signal indicating movement and/or orientation of the controller 100, and a haptic feedback generator 650 that generates touch based signaling (e.g., vibration of a housing of the controller 100) feedback to a passenger.

In one embodiment, the processing device 610 is configured to respond to user input by communicating commands to control the display of content (e.g., movies/television programming, application programs, etc.) on the associated SVDU 400, and to control the display of information received from the head end content server 410 and/or received from the associated SVDU 400 on the display device 632 of the controller 100. As explained above, content can be concurrently displayed on the controller 100 and the associated SVDU 400.

The controller 100 and the associated SVDU 400 may communicate through a wired and/or wireless interface. With further reference to FIG. 14, the network interface 640 can include a near field transceiver 600 (e.g., NFC and/or RFID), a Bluetooth transceiver 602, a WLAN transceiver (e.g., WIFI) 604, a cellular transceiver 606, and/or an IR (infrared) transceiver 607 that is configured to communicate with a corresponding remote wireless transceiver associated with the SVDU 400, the docking cradle 100, the wireless router 430, the seat electronics box 500 and/or another communication component of the system. The network interface 640 may include other types of wireless transceivers, including WiFi-Direct, WirelessUSB, Ultra Wideband (UWB), and optical transceivers such as infrared. In one embodiment, the docking cradle 200 can be configured to sense that the controller 100 is stored therein through communications with the near field transceiver 600.

In various embodiments, the controller 100 may be constructed of appropriate materials to meet applicable aircraft industry standards and requirements. For example, a head impact criteria (HIC) test may be satisfied by the controller 100. The controller 100 may be ideally suited for extreme environments such as that of an aircraft. These extreme environments may include vibration, large temperature variations, EMI (Electromagnetic Interference), and shock/vibration which may cause reliability problems with standard commercial grade entertainment system controllers.

The functionality of the controller 100 as a touch screen interface for controlling the IFE system can facilitate straightforward, inexpensive, and rapid customization and branding of the controller 100 onboard the aircraft. For example, the IFE system manufacturer and/or the aircraft operator (e.g., airline) may customize the passenger interface of the controller 100 and SVDU 400 through software and/or graphical modifications input to the controller 100, and therefore may not require replacement of hardware to provide customization.

Moreover, the touch sensitive display 632 of the controller 100 facilitates the passenger's browsing and selection of IFE system functions, applications, and content in an intuitive manner without requiring the passenger to switch focus between the controller 100 and the separate SVDU 400. Furthermore, the passenger may have the option to direct content to the associated SVDU 400 which may be mounted in a seat back in front of the passenger's seat, or direct the content to the touch sensitive display 632 of the controller 100 for more personal viewing, local games, and/or convenient interaction.

In this way, the controller 100 may provide the passenger with an effective dual-screen display in combination with the respective video display unit to facilitate multitasking such as watching a movie while ordering meals and beverages, shopping, checking or sending email, viewing a real-time updating map of the flight's progress, playing a local game, or enjoying other entertainment options.

As explained above, the controller 100 may include an inductive charging circuit 660 that inductively couples to a corresponding inductive charging circuit 1540 (FIG. 15) within a handheld controller 100, while stored in the recessed area of the housing of the controller 100, to receive power from the controller 100. The inductive charging circuit 660 uses the received power to charge a battery that powers electronic circuitry of the controller 100.

Using a First Wireless Link to Pair a Controller and a SVDU Across a Wired Network In one embodiment, the processing device 610 of a controller 100 uses a wireless communication link to identify a SVDU 400 and/or a docking cradle 200 with which it is to be associated. The processing device 610 then uses the SVDU identity and/or the docking cradle 200 identity to perform further communications through a wired network with the SVDU 400. The processing device 610 may therefore control the wireless transceiver 600-607 to establish a wireless communication link with the remote wireless transceiver to receive an identifier for the SVDU 400, and then control the wired network interface 608 to use the identifier to communicate a command through the wired data network to control the display of the first content on the SVDU 400.

In one embodiment, the controller 100 may be associated with a particular SVDU 400 by swiping the controller 100 across a NFC or RFID tag that is located on (or otherwise associated with) the SVDU 400 and/or the docking cradle 200 to cause transmission of an identifier of the SVDU 400 from the NFC or RFID tag to the controller 100, which can occur without performing pairing operations between the near field transceiver 600 and the NFC or RFID tag and without the associated steps required of an operator/passenger.

In a further embodiment, the wireless transceiver can include a near field transceiver 600 that is configured to communicate with a remote near field transceiver associated with the SVDU 400 and/or the docking cradle 200. The processing device 610 can control the near field transceiver 600 to establish the communication link with the remote near field transceiver to receive the identifier for the SVDU 400 without performing pairing of the near field transceiver 600 and the remote near field transceiver. The processing device 610 can then use the identifier as a network address for the SVDU 400, or can determine a network address for the SVDU 400 using the identifier, to enable communication of command through the wired network to control the display of content on the associated SVDU 400.

Using a First Wireless Link to Pair a Controller and SVDU Across a Second Wireless Link In another embodiment, the controller 100 uses the near field transceiver 600 as described above to receive an identifier for a particular SVDU 400 and/or a particular docking cradle 200 (e.g. by swiping the near field transceiver 600 by a NFC or RFID tag associated with the SVDU 400 or the docking cradle 200) without performing pairing of the first wireless transceiver and the remote first wireless transceiver. The processing device 610 then controls a selected other one of the transceivers, such as the Bluetooth transceiver 602, the WLAN transceiver 604, and/or the cellular transceiver 606 to use the identifier to perform pairing to a corresponding remote transceiver (i.e., Bluetooth transceiver, WLAN transceiver, and/or cellular transceiver) of the SVDU 400 to establish a second communication link with the remote transceiver. The processing device 610 communicates commands through the selected transceiver to control the display of content of the SVDU 400, to control the delivery of content from the SVDU 400 to the controller 100, and/or to control the delivery of content from the head end content server 410 to the controller 100 and/or to the SVDU 400.

In a further embodiment, the processing device 610 controls the Bluetooth transceiver 602 to use the identifier to perform pairing to a remote Bluetooth transceiver of the SVDU 400 to establish a Bluetooth communication link, and to then control the SVDU 400 and/or the head end content server 410 through the Bluetooth communication link.

In another further embodiment, the processing device 610 controls the WLAN transceiver 604 to use the identifier to perform pairing to a WLAN transceiver of the wireless router 430, and establish a communication link through the wireless router 430 to the SVDU 400. The processing device 610 can then control the SVDU 400 and/or the head end content server 410 through the WLAN communication link.

Example Network Node

Figure 15:
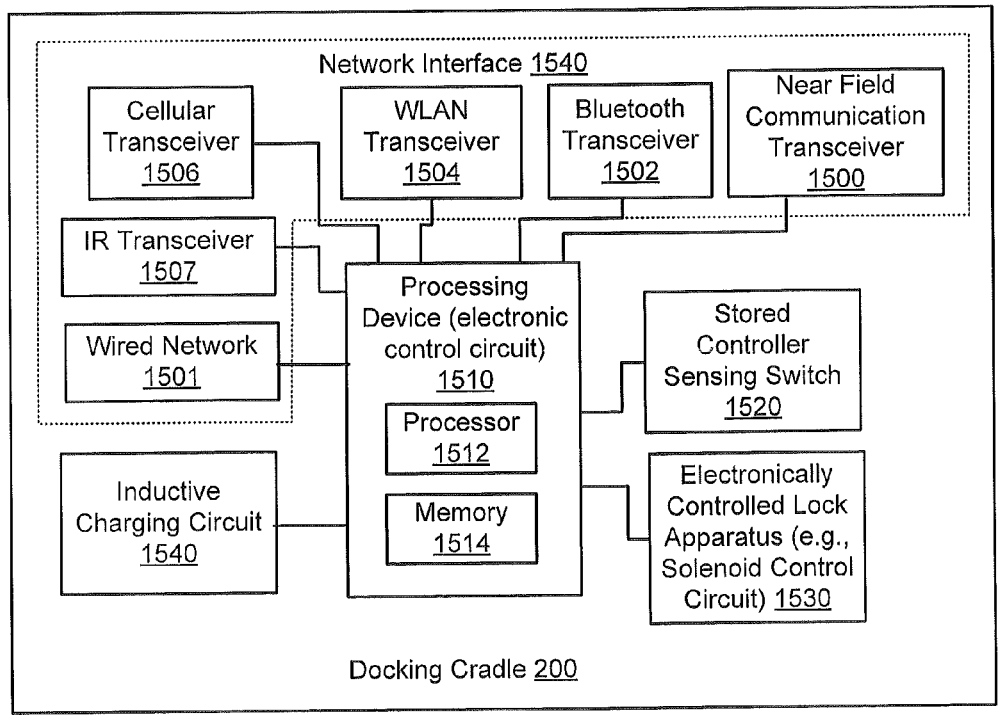
FIG. 15 is a block diagram of a docking cradle that is configured according to some embodiments of the present invention.

FIG. 15 is a functional circuit block diagram of a docking cradle 200 configured according to some embodiments of the present invention. The network docking cradle 200 may include a network interface 1540 that may include a wired network interface 1501 (e.g., Ethernet), a near field transceiver 1500 (e.g., a NFC and/or RFID transceiver), a Bluetooth transceiver 1502, a WLAN transceiver 1504, a cellular transceiver 1506, and/or an IR transceiver 1507 that are configured to communicate with the crew management terminal 1200 via a wired/wireless connection and/or the associate (communicatively connected) controller 100 via a wireless connection.

The processing device 1510, also referred to as an electronic control circuit, may include one or more data processors 1512, such as a general purpose and/or special purpose processor (e.g., microprocessor and/or digital signal processor), and memory 1514. The processor 1512 is configured to execute computer program instructions from the memory 1514, described below as a computer readable media, to perform at least some of the operations and methods described herein as being performed by the docking cradle in accordance with one or more embodiments of the present invention.

The docking cradle 200 can further include a sensing switch 1520, such as a mechanical or electromagnetic switch (e.g., magnetic reed switch) that is actuated by the controller 100 being docked in the docking cradle 200. The processing device 1510 can determine whether a controller 100 is stored responsive to a signal from the sensing switch 1520.

Communications between the near field communication transceiver 1500, the Bluetooth transceiver 1502, the IR transceiver 1507, and/or the WLAN transceiver 1504 (e.g., a low power-short range WLAN transceiver) and an associated transceiver of the controller 100 can be used to determine whether the controller 100 has been moved outside a defined range of the associated docking cradle 200, and a flight attendant can be notified via the crew management terminal 1200 responsive to that determination.

As explained above, the docking cradle 200 may include an inductive charging circuit 1540 that can inductively charge a battery of the controller 100. The processing device 1510 may determine whether the controller 100 is docked by sensing whether the inductive charging coil circuit 1540 is inductively coupled to the inductive charging circuit 1102 (FIG. 11) of the controller 100. The processing device 1510 can monitor inductive loading of the inductive charging circuit 1540 to determine whether a handheld controller is stored in the recessed area of the housing.

The processing device 1510 can respond to a lock/unlock signal from the crew management terminal 1200 and/or another system component to control lock/unlock movement of the solenoid 222 via the solenoid control circuit 1530.

FURTHER DEFINITIONS

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention.

Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

For the sake of brevity, conventional electronics, systems, and software functional aspects of the systems (and components of the individual operating components of the systems) may not be described in detail. Furthermore, the connecting lines, or connectors shown in the various figures presented are intended to represent example communication/functional relationships and/or physical or logical couplings between the various elements. It should be noted that many alternative or additional functional relationships, physical connections or logical connections may be present in a practical device. The words "mechanism" and "element" are used broadly and are not limited to mechanical or physical embodiments, but may include software routines in conjunction with processors, etc.

As used herein, the terms "comprise", "comprising", "comprises", "include", "including", "includes", "have", "has", "having", or variants thereof are open-ended, and include one or more stated features, integers, nodes, steps, components or functions but does not preclude the presence or addition of one or more other features, integers, nodes, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

The use of any and all examples, or exemplary language (e.g., "such as") provided herein, is intended merely to better illuminate the invention and does not pose a limitation on the scope of the invention unless otherwise claimed. The use of the terms "a" and "an" and "the" and similar referents in the context of describing the invention (especially in the context of the following claims) are to be construed to cover both the singular and the plural, unless the context unambiguously indicates otherwise. In addition, it should be understood that although the terms "first," "second," etc. may be used herein to describe various elements, these elements should not be limited by these terms, which are only used to distinguish one element from another. The term "and/or", abbreviated "/", includes any and all combinations of one or more of the associated listed items.

When a component/node is referred to as being "connected", "coupled", "responsive", or variants thereof to another node, it can be directly connected, coupled, or responsive to the other component/node or intervening components/nodes may be present. In contrast, when a component node is referred to as being "directly connected", "directly coupled", "directly responsive", or variants thereof to another component/node, there are no intervening components/nodes present. Like numbers refer to like components/nodes throughout.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable media that can direct a computer or other programmable data processing apparatus to function in a particular manner, such that the instructions stored in the computer-readable media produce an article of manufacture including instructions which implement the functions/acts specified in the block diagrams and/or flowchart block or blocks.

A tangible, non-transitory computer-readable media may include an electronic, magnetic, optical, electromagnetic, or semiconductor data storage system, apparatus, or device. More specific examples of the computer-readable media would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions may also be loaded onto a computer and/or other programmable data processing device to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present invention may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Other handheld controllers, docking cradles, SVDUs, systems, and/or methods according to embodiments of the invention will be or become apparent to one with skill in the art upon review of the present drawings and description. It is intended that all such additional handheld controllers, docking cradles, SVDUs, systems, and/or methods be included within this description. Moreover, it is intended that all embodiments disclosed herein can be implemented separately or combined in any way and/or combination.

What is claimed is:

1. A docking cradle of an entertainment system, the docking cradle comprising:
    a housing having a recessed area to receive and store a handheld controller, wherein the housing comprises a retention surface that extends over the recessed area of the housing to engage a first end portion of the handheld controller stored in the docking cradle;
    an electronically controlled lock apparatus connected to the housing and configured to lock the handheld controller within the recessed area of the housing preventing removal by a user responsive to a lock electrical signal from a management terminal separate from the docking cradle, and configured to unlock the handheld controller permitting removal by a user from the recessed area of the housing responsive to an unlock electrical signal from the management terminal; and
    a locking tab that extends over the recessed area of the housing to engage a second end portion, opposite to the first end portion, of the handheld controller stored in the docking cradle,
    wherein the electronically controlled lock apparatus responds to the unlock electrical signal from the management terminal by enabling movement of the locking tab to release the second end portion of the handheld controller when a user presses an unlock button connected to the housing, and responds to the lock electrical signal from the management terminal by disabling movement of the locking tab to prevent release of the second end portion of the handheld controller when a user presses the unlock button.

2. The docking cradle of claim 1, wherein:
the electronically controlled lock apparatus comprises a solenoid controlled by an electronic control circuit that responds to the lock and unlock electrical signals, wherein the solenoid is controlled responsive to the lock electrical signal to move an arm structure to block movement of the locking tab when a user presses the unlock button, and the solenoid is controlled by the electronic control circuit responsive to the unlock electrical signal to move the arm structure to not block movement of the locking tab when a user presses the unlock button.

3. The docking cradle of claim 1, further comprising:
an inductive charging circuit within the housing that inductively couples to a corresponding inductive charging circuit within a handheld controller, which is stored in the recessed area of the housing, to supply power to charge a battery of the handheld controller.

4. The docking cradle of claim 3, further comprising:
an electronic control circuit that determines whether a handheld controller is stored in the recessed area of the housing by sensing whether the inductive charging circuit is inductively coupled to an inductive charging circuit within a handheld controller; and communicates with the management terminal to electronically report a status of whether a handheld controller is stored in the recessed area of the docking cradle.

5. The docking cradle of claim 4, wherein the electronic control circuit monitors inductive loading of the inductive charging circuit to determine whether a handheld controller is stored in the recessed area of the housing.

6. The docking cradle of claim 1, further comprising:
an electronic control circuit that communicates with the management terminal to report a status of whether a handheld controller is stored in the recessed area of the docking cradle.

7. The docking cradle of claim 6, further comprising:
a network interface within the housing that communicates through a data network with a head end content server; and
a first transceiver circuit within the housing that communicates through a wireless communication link with a second transceiver circuit of a handheld controller to relay commands received via the second transceiver circuit from the handheld controller to the head end content server via the network interface, and to relay media received from the head end content server to the handheld controller via the second transceiver circuit.

8. The docking cradle of claim 7, wherein:
the first transceiver circuit comprises a near field communication transceiver; and
the electronic control circuit determines whether a handheld controller is stored in the recessed area of the housing by attempting to communicate through the near field communication transceiver with a near field communication transceiver of the handheld controller, and communicates with the management terminal to report whether a handheld controller is stored in the recessed area of the housing.

9. A docking cradle of an entertainment system, the docking cradle comprising:
a housing having a recessed area to receive and store a handheld controller; and
an electronically controlled lock apparatus connected to the housing and configured to lock the handheld controller within the recessed area of the housing preventing removal by a user responsive to a lock electrical signal from a management terminal separate from the docking cradle, and configured to unlock the handheld controller permitting removal by a user from the recessed area of the housing responsive to an unlock electrical signal from the management terminal;
an electronic control circuit that communicates with the management terminal to report a status of whether a handheld controller is stored in the recessed area of the docking cradle; and
a mechanical or electromechanical switch that is actuated by storing and removing a handheld controller from the recessed area of the housing, wherein the electronic control circuit determines whether a handheld controller is stored in the recessed area of the housing responsive to a signal from the mechanical or electromechanical switch, and communicates with the management terminal to report whether a handheld controller is stored in the recessed area of the housing.

10. A docking cradle of an entertainment system, the docking cradle comprising:
a housing having a recessed area to receive and store a handheld controller; and
an electronically controlled lock apparatus connected to the housing and configured to lock the handheld controller within the recessed area of the housing preventing removal by a user responsive to a lock electrical signal from a management terminal separate from the docking cradle, and configured to unlock the handheld controller permitting removal by a user from the recessed area of the housing responsive to an unlock electrical signal from the management terminal; and
an electronic control circuit that communicates with the management terminal to report a status of whether a handheld controller is stored in the recessed area of the docking cradle,
wherein the electronic control circuit determines whether a handheld controller is stored in the recessed area of the docking cradle, and responds to receiving a command from the management terminal for the docking cradle to lock a handheld controller that is determined to not be presently stored in the recessed area by transmitting a sound generation command through a transceiver circuit to the handheld controller to command generation of an alert sound through a speaker of the handheld controller.

11. A vehicle entertainment system comprising:
a plurality of docking cradles, each comprising:
a housing with a recessed area to receive and store a handheld controller;
an electronically controlled lock apparatus connected to the housing and configured to lock the handheld controller within the recessed area of the housing preventing removal by a user responsive to a lock electrical signal, and configured to unlock the handheld controller permitting removal by a user from the recessed area of the housing responsive to an unlock electrical signal; and
an electronic control circuit that communicates a status of whether a handheld controller is stored in the recessed area of the docking cradle; and
a management terminal communicatively connected to the docking cradles to control generation of the lock and unlock electrical signals provided to the electronically controlled lock apparatus, and to receive and display on a display device the status of which of the docking cradles store a handheld controller, wherein:

each of a plurality of the docking cradles are connected to different ones of a plurality of seats in a vehicle;

the management terminal displays on the display device a map of user seats in the vehicle and indicates a status of which of the seats have handheld controllers docked or not docked in the docking cradles connected to the seats;

the management terminal displays on the display device at least one user selectable indicia that is touch selectable by a user to control generation of the lock electrical signals provided to a defined one or more of the docking cradles to lock handheld controllers stored in the docking cradles to prevent removal by users, and to control generation of the unlock electrical signals provided to the defined one or more of the docking cradles to unlock handheld controllers stored in the docking cradles to permit removal by users; and each of the docking cradles is configured to determine whether a handheld controller is stored in the recessed area of the docking cradle, and to respond to receiving a command from the management terminal to lock a handheld controller that is determined to not be presently stored in the recessed area by transmitting a sound generation command through a transceiver circuit to the handheld controller to command generation of an alert sound through a speaker of the handheld controller.

12. The vehicle entertainment system of claim 11, further comprising:

a plurality of seat video display units (SVDUs) connected to passenger seats within a vehicle, each of the SVDUs comprising a first transceiver circuit that transmits an identifier for the SVDU, a second transceiver circuit, and a processing device;

the handheld controllers each comprise a first transceiver circuit, a second transceiver circuit, and a processing device;

wherein the first transceiver circuits of a pair of one of the SVDUs and one of the handheld controllers communicates an identifier for one of the pair to the other one of the pair, and the processing device of the other one of the pair uses the received identifier to control the second transceiver circuit to perform pairing to establish a communication link between the second transceiver circuits of the pair.

13. The vehicle entertainment system of claim 12, wherein:

the first transceiver circuits comprise Radio Frequency IDentification (RFID) circuits; and the second transceiver circuits comprise WLAN transceiver circuits, Bluetooth transceiver circuits, and/or cellular transceiver circuits.

14. The vehicle entertainment system of claim 12, wherein:

the management terminal communicates with the SVDUs to receive information on pairings between SVDUs and handheld controllers, maintains a list of the pairings, and uses the list of the pairings to determine routing information used to route media from a head end content server through one of the SVDUs to one of the handheld controllers paired to the one of the SVDUs.

15. A vehicle entertainment system comprising:

a plurality of docking cradles, each comprising:

a housing with a recessed area to receive and store a handheld controller;

an electronically controlled lock apparatus connected to the housing and configured to lock the handheld controller within the recessed area of the housing preventing removal by a user responsive to a lock electrical signal, and configured to unlock the handheld controller permitting removal by a user from the recessed area of the housing responsive to an unlock electrical signal; and an electronic control circuit that communicates a status of whether a handheld controller is stored in the recessed area of the docking cradle; and a management terminal communicatively connected to the docking cradles to control generation of the lock and unlock electrical signals provided to the electronically controlled lock apparatus, and to receive and display on a display device the status of which of the docking cradles store a handheld controller, wherein the management terminal is communicatively connected to receive aircraft flight information, and to control generation of the lock and unlock electrical signals provided to the docking cradles to lock and unlock handheld controllers stored in the docking cradles responsive to the aircraft flight information, and wherein the management terminal controls generation of the unlock electrical signal provided to the docking cradles to unlock handheld controllers stored in the docking cradles responsive to the vehicle reaching an altitude or other defined condition when use of wireless communications equipment by users is authorized.

16. A vehicle entertainment system comprising:

a plurality of docking cradles, each comprising:

a housing with a recessed area to receive and store a handheld controller;

an electronically controlled lock apparatus connected to the housing and configured to lock the handheld controller within the recessed area of the housing preventing removal by a user responsive to a lock electrical signal, and configured to unlock the handheld controller permitting removal by a user from the recessed area of the housing responsive to an unlock electrical signal; and an electronic control circuit that communicates a status of whether a handheld controller is stored in the recessed area of the docking cradle;

a management terminal communicatively connected to the docking cradles to control generation of the lock and unlock electrical signals provided to the electronically controlled lock apparatus, and to receive and display on a display device the status of which of the docking cradles store a handheld controller; and a theft detector positioned at a defined location within the vehicle and configured to output an alert message responsive to detecting that a handheld controller is being carried within a sensing range of the theft detector, wherein the management terminal is communicatively connected through a data network to receive the alert message from the theft detector, and to respond to the alert message by generating an alert indication to a user, the management terminal maintains a list of known associations between handheld controllers and user names;

the alert message identifies the handheld controller detected as being carried within a sensing range of the theft detector; and the management terminal responds to the alert message by using the handheld controller identity to determine the associated user name from the list, and to include the associated user name with the alert indication to the user.

17. A vehicle entertainment system comprising:

a plurality of docking cradles, each comprising:
- a housing with a recessed area to receive and store a handheld controller;
- an electronically controlled lock apparatus connected to the housing and configured to lock the handheld controller within the recessed area of the housing preventing removal by a user responsive to a lock electrical signal, and configured to unlock the handheld controller permitting removal by a user from the recessed area of the housing responsive to an unlock electrical signal; and
- an electronic control circuit that communicates a status of whether a handheld controller is stored in the recessed area of the docking cradle;

a management terminal communicatively connected to the docking cradles to control generation of the lock and unlock electrical signals provided to the electronically controlled lock apparatus, and to receive and display on a display device the status of which of the docking cradles store a handheld controller; and a theft detector positioned at a defined location within the vehicle and configured to output an alert message responsive to detecting that a handheld controller is being carried within a sensing range of the theft detector, wherein the management terminal is communicatively connected through a data network to receive the alert message from the theft detector, and to respond to the alert message by generating an alert indication to a user, the alert message identifies the handheld controller detected as being carried beyond the defined region of the vehicle; and the management terminal responds to the alert message by communicating a command through the data network for wireless communication to the handheld controller identified by the alert message to generate an alert sound therefrom.

18. A vehicle entertainment system comprising:

a plurality of docking cradles, each comprising:
- a housing with a recessed area to receive and store a handheld controller;
- an electronically controlled lock apparatus connected to the housing and configured to lock the handheld controller within the recessed area of the housing preventing removal by a user responsive to a lock electrical signal, and configured to unlock the handheld controller permitting removal by a user from the recessed area of the housing responsive to an unlock electrical signal; and
- an electronic control circuit that communicates a status of whether a handheld controller is stored in the recessed area of the docking cradle;

a management terminal communicatively connected to the docking cradles to control generation of the lock and unlock electrical signals provided to the electronically controlled lock apparatus, and to receive and display on a display device the status of which of the docking cradles store a handheld controller;

a theft detector positioned at a defined location within the vehicle and configured to output an alert message responsive to detecting that a handheld controller is being carried within a sensing range of the theft detector, wherein the management terminal is communicatively connected through a data network to receive the alert message from the theft detector, and to respond to the alert message by generating an alert indication to a user; and a plurality of the handheld controllers, each of the handheld controllers comprising a transceiver circuit to communicate with the theft detector to receive a sound generation command, and processing circuitry to respond to the sound generation command by generating an alert sound through a speaker.

* * * * *